(12) United States Patent
Tremblay et al.

(10) Patent No.: US 6,279,100 B1
(45) Date of Patent: Aug. 21, 2001

(54) LOCAL STALL CONTROL METHOD AND STRUCTURE IN A MICROPROCESSOR

(75) Inventors: Marc Tremblay, Menlo Park; Sharada Yeluri, Sunnyvale, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/204,535

(22) Filed: Dec. 3, 1998

(51) Int. Cl.[7] ............................................. G06F 9/38
(52) U.S. Cl. ................................. 712/24; 712/219
(58) Field of Search .............................. 712/24, 219

(56) References Cited

U.S. PATENT DOCUMENTS

| | | | |
|---|---|---|---|
| 5,222,240 | * | 6/1993 | Patel ....................................... 712/218 |
| 5,524,263 | * | 6/1996 | Griffith ..................................... 712/23 |
| 5,537,561 | | 7/1996 | Nakajima .............................. 395/375 |
| 5,657,291 | | 8/1997 | Podlesny et al. ................ 365/230.05 |
| 5,721,868 | | 2/1998 | Yung et al. ............................ 711/149 |
| 5,761,475 | | 6/1998 | Yung et al. ............................ 712/218 |
| 5,764,943 | | 7/1998 | Wechsler ............................... 712/218 |
| 5,778,248 | | 7/1998 | Leung ..................................... 712/23 |
| 5,787,303 | | 7/1998 | Ishikawa ........................... 395/800.24 |
| 6,055,620 | * | 4/2000 | Paver ..................................... 712/201 |

FOREIGN PATENT DOCUMENTS

| | | | |
|---|---|---|---|
| 0 649 085 | 4/1985 | (EP) | .................................. G06F/9/38 |
| 0 730 223 | 9/1996 | (EP) | .................................. G06F/9/38 |
| WO 96/27833 | 9/1996 | (WO) | ................................ G06F/9/38 |

OTHER PUBLICATIONS

Kazuaki Murakami et al: "SIMP (Single Instruction stream/Multiple instruction Pipelining): A Novel High–Speed Single–Processor Architecture" Computer Architecture News, US, Association for Computing Machinery, New York, vol. 17, No. 3, June 1, 1989, pp. 78–85, XP000035291 ISSN: 0163–5964.

* cited by examiner

Primary Examiner—Eric Coleman
(74) Attorney, Agent, or Firm—Skjerven Morrill MacPherson LLP; Ken J. Koestner

(57) ABSTRACT

A processor implements a local stall functionality in which small, independent circuit units are stalled locally with the condition causing a stall being first detected locally, then propagated to other small independent circuit units. Stall conditions for a functional unit are detected locally with reduced logic circuitry and also without waiting to receive condition information from other functional units that is transmitted over long wires. Local stall logic circuits are distributed over diverse areas of an integrated circuit so that stall conditions are detected locally. A local stall is expanded into a global stall by propagation to logic circuits beyond a local region in subsequent cycles. Local detection of stall conditions and local stalling eliminates many critical paths in the processor.

27 Claims, 32 Drawing Sheets

|         | gfu  | ldx  | mfu1  | mfu2 | mfu3 | long  |
|---------|------|------|-------|------|------|-------|
| level_1 | E    | ldx1 | E     |      |      | E6E34 |
| level_2 | A1   | ldx2 | A1/E2 |      |      | A4    |
| level_3 | gfu A2 | ldx ldx3 | mfu1 A2 | mfu2 | mfu3 | long |
| level_4 | A3   | ldx4 | A3/E4 |      |      |       |
| level_5 | T    |      | T     | T    | T    |       |
| level_6 | WB   |      | WB    | WB   | WB   |       |
| level_7 | RFO  |      |       |      |      |       |

*FIG. 7C*

| E  | A1 | A2 | A3 | T | WB | —810 |
|----|----|----|----|---|----|------|

| E1 | E2 | A2 | A3 | T | WB | —812 |
|----|----|----|----|---|----|------|

| E1 | E2 | E3 | E4 | T | WB | —814 |
|----|----|----|----|---|----|------|

*FIG. 8*

| group | mfu3 | mfu2 | mfu1 | gfu |
|---|---|---|---|---|
| vliw_1 | mfu3_1 | mfu2_1 | mfu1_1 | gfu_1 |
| vliw_2 | mfu3_2 | mfu2_2 | mfu1_2 | gfu_2 |
| vliw_3 | mfu3_3 | mfu2_3 | mfu1_3 | gfu_3 |
| vliw_4 | mfu3_4 | mfu2_4 | mfu1_4 | gfu_4 |
| vliw_5 | mfu3_5 | mfu2_5 | mfu1_5 | gfu_5 |

FIG. 9A

| cycle | 1 | 2 | 3 | 4 | 5 | 6 | 7 | 8 | 9 | 10 | 11 | 12 | 13 |
|---|---|---|---|---|---|---|---|---|---|---|---|---|---|
| mfu1_1 | D | E1 | E2 | X | E3 | E4 | T | WB | | | | | |
| helper | | D | E1 | E2 | X | E3 | E4 | T | WB | | | | |
| gfu_1 | D | E | E | A1 | A2 | A3 | T | WB | | | | | |
| gfu_2 | | D | D | E | E | A1 | A2 | A3 | T | WB | | | |

FIG. 9B

| cycle | 1 | 2 | 3 | 4 | 5 | 6 | 7 | 8 | 9 | 10 | 11 | 12 | 13 |
|---|---|---|---|---|---|---|---|---|---|---|---|---|---|
| mfu_1 | D | E1 | E2 | X1 | X2 | X3 | E3 | E4 | T | WB | | | |
| helper | | D | E1 | E2 | X1 | X2 | X3 | E3 | E4 | T | WB | | |
| gfu_1 | D | E | E | E | E | A1 | A2 | A3 | T | WB | | | |
| vliw_2 | | D | D | D | D | E | E | A1 | A2 | A3 | T | WB | |

FIG. 9C

| cycle   | 1 | 2  | 3  | 4  | 5  | 6  | 7  | 8  | 9  | 10 | 11 | 12 |
|---------|---|----|----|----|----|----|----|----|----|----|----|----|
| mfu1_1  | D | E1 | E2 | X1 | X2 | X3 | E3 | E4 | T  | WB |    |    |
| helper  |   | D  | E1 | E2 | X1 | X2 | X3 | E3 | E4 | T  | WB |    |
| mfu1_2  |   |    | D  | D  | D  | E  | E  | A1 | A2 | A3 | T  | WB |
|         |   |    |    |    |    |    |    |    |    |    |    |    |
| mfu2_1  | D | E  | E  | E  | E  | A1 | A2 | A3 | T  | WB |    |    |
| mfu2_2  |   |    | D  | D  | D  | E1 | E2 | X  | E3 | E4 | T  |    |
| helper  |   |    |    |    |    | D  | E1 | E2 | X  | E3 | E4 | T  |
|         |   |    |    |    |    |    |    |    |    |    |    |    |
| gfu_1   | D | E  | E  | E  | E  | A1 | A2 | A3 | T  | WB |    |    |
| gfu_2   |   | D  | D  | D  | D  | E  | E  | A1 | A2 | A3 | T  | WB |

*FIG. 10A*

| cycle   | 1 | 2  | 3  | 4  | 5  | 6  | 7  | 8  | 9  | 10 | 11 | 12 |
|---------|---|----|----|----|----|----|----|----|----|----|----|----|
| mfu1_1  | D | E1 | E1 | E1 | E1 | E2 | A2 | A3 | T  | WB |    |    |
| helper  |   | D  | D  | D  | D  | E1 | E2 | A2 | A3 | T  | WB |    |
| mfu1_2  |   |    |    |    | D  | E  | A1 | A2 | A3 | T  | WB |    |
|         |   |    |    |    |    |    |    |    |    |    |    |    |
| mfu2_1  | D | E1 | E1 | E1 | E2 | X  | E3 | E4 | T  | WB |    |    |
| helper  |   | D  | D  | D  | E1 | E2 | X  | E3 | E4 | T  | WB |    |
| mfu2_2  |   |    |    | D  | D  | E  | A1 | A2 | A3 | T  | WB |    |
|         |   |    |    |    |    |    |    |    |    |    |    |    |
| mfu3_1  | D | E1 | E2 | X1 | X2 | X3 | E3 | E4 | T  | WB |    |    |
| helper  |   | D  | E1 | E2 | X1 | X2 | X3 | E3 | E4 | T  | WB |    |
| mfu3_2  |   | D  | D  | D  | D  | E  | A1 | A2 | A3 | T  | WB |    |
|         |   |    |    |    |    |    |    |    |    |    |    |    |
| gfu_1   | D | E  | E  | E  | E  | A1 | A2 | A3 | T  | WB |    |    |
| gfu_2   |   | D  | D  | D  | D  | D  | E  | A1 | A2 | A3 | T  | WB |

FIG. 10B

| cycle | 1 | 2 | 3 | 4 | 5 | 6 | 7 | 8 | 9 | 10 | 11 | 12 |
|---|---|---|---|---|---|---|---|---|---|---|---|---|
| mfu1_1 | D | E1 | E1 | E1 | E1 | E2 | A2 | A3 | T | WB | | |
| mfu1_2 | | D | D | D | D | E | E | A1 | A2 | A3 | T | WB |
| | | | | | | | | | | | | |
| mfu2_1 | D | E1 | E1 | E1 | E2 | X | E3 | E4 | T | WB | | |
| helper | | D | D | D | E1 | E2 | X | E3 | E4 | T | WB | |
| mfu2_2 | | | | D | E | E | A1 | A2 | A3 | T | WB | |
| | | | | | | | | | | | | |
| mfu3_1 | D | E1 | E2 | X1 | X2 | X3 | E3 | E4 | T | WB | | |
| helper | | D | E1 | E2 | X1 | X2 | X3 | E3 | E4 | T | WB | |
| mfu3_2 | | | D | D | D | E | E | A1 | A2 | A3 | T | WB |
| | | | | | | | | | | | | |
| gfu_1 | D | E | E | E | E | A1 | A2 | A3 | T | WB | | |
| gfu_2 | | D | D | D | D | E | E | A1 | A2 | A3 | T | WB |

FIG. 10C

| cycle | 1 | 2 | 3 | 4 | 5 | 6 | 7 | 8 | 9 | 10 | 11 | 12 |
|---|---|---|---|---|---|---|---|---|---|---|---|---|
| load | D | E | C | A2 | A3 | T | WB | | | | | |
| membar | | D | E | E | E | A1 | A2 | A3 | T | WB | | |
| instrx | | | | | D | E | A1 | A2 | A3 | T | WB | |

| cycle | 1 | 2 | 3 | 4 | 5 | 6 | 7 | 8 | 9 | 10 | 11 | 12 |
|---|---|---|---|---|---|---|---|---|---|---|---|---|
| setir | D | E | C | A2 | A3 | T | WB | | | | | |
| load | | D | E | C | A2 | A3 | T | WB | | | | |
| load | | | D | E | E | E | A1 | A2 | A3 | T | WB | |
| instrx | | | | | | D | E | A1 | A2 | A3 | T | WB |

FIG. 14

| stall | description |
|---|---|
| mf2_stall_d/ mf3_stall_d | Similar to above. These are the local D-stage stalls for mfu2 and mfu3 units |
| pcu_stall_d | All the D-stage stalls combined gf_stalld OR mf1_stalld OR mf2_stalld OR mf3_stalld |
| gf_other_stall_d | OR of D-stage stalls generated by mfu1, mfu2, and mfu3 units. (mf1_stalld OR mf2_stalld OR mf3_stalled) |
| mf1_other_stall_d | gf_stalld OR mf2_stalld OR mf3_stalld |
| mf2_other_stall_d/ mf3_other_stall_d | Similar to above |
| gf_local_stall_e | gfu instruction stalls in E-stage waiting for other instructions to catch up |
| mf1_local_stall_e/ mf2_local_stall_e/ mf3_local_stall_e | Similar to above |
| gf_ld_stall_e | This is E-stage stall generated by gfu instruction. This stall is asserted only if all the instructions in the same VLIW packet have entered E-stage and the E-stage stall causing condition still exists. |
| mf1_ld_stall_e | Similar to above for mfu1 instruction |
| gf_pair_stall_e | gfu instruction stalling in E-stage for synchronization |
| gf_prev_pair_stall_e | gfu instruction stalling in E-stage(port conflict of a helper) |
| pcu_stall_e | Global E-stage stall (load dependency). This is propagated to all the units. (gf_ld_stalle OR mf1_ld_stalle) |
| gf_stall_e | All the conditions for which gfu instruction stalls in E-stage |
| mf1_stall_e | All the conditions for which mfu1 instruction stalls in E-stage |
| mf2_stall_e/ mf3_stall_e | similar to above |
| gf_disable_d | Disable D-stage flops for D-stage/E-stage stalls of gfu |
| mf1_disable_d | This goes to disable the D-stage flops of mfu1 unit |
| mf2_disable_d/ mf3_disable_d | similar to above |
| pcu_stall | This is OR of pcu_stall_d, pcu_stall_e pcu_stalld OR pcu_stalle |

| VLIW | MFU1 | GFU |
|---|---|---|
| vliw_0 |  | lg_0 ra, rb, r2 |
| vliw_1 | m1_1 r1, r2, r3 | ld_1 r4, r5, r1 |
| vliw_2 | m1_2 r1, r6, r7 | ld_2 r1, r8, r9 |

*FIG. 20A*

| cycle | 1 | 2 | 3 | 4 | 5 | 6 | 7 | 8 | 9 | 10 | 11 | 12 | 13 |
|---|---|---|---|---|---|---|---|---|---|---|---|---|---|
| lg_0 | E3 | E4 | E5 | E6 | A4 | WB |  |  |  |  |  |  |  |
| m1_1 | D | D | D | D | E | A1 | A2 | A3 | T | WB |  |  |  |
| ld_1 | D | E | E | E | E | A1 | A2 | A3 | T | WB |  |  |  |
| m1_2 |  |  |  |  | D | D | E | A1 | A2 | A3 | T | WB |  |
| ld_2 |  | D | D | D | D | D | E | A1 | A2 | A3 | T | WB |  |

*FIG. 20B*

| VLIW | MFU2 | MFU1 | GFU |
|---|---|---|---|
| vliw_1 |  |  | ld_0 r1, r2, r3 |
| vliw_2 | m2_1 r4, r5, r6 | m1_1 r3, r7, r8 | ld_1 r3, r10, r7 |

*FIG. 21A*

| cycle | 1 | 2 | 3 | 4 | 5 | 6 | 7 | 8 | 9 | 10 | 11 | 12 | 13 |
|---|---|---|---|---|---|---|---|---|---|---|---|---|---|
| ld_0 | D | E | A1 | A2 | A3 | T | WB |  |  |  |  |  |  |
| ld_1 |  | D | D | E | A1 | A2 | A3 | T | WB |  |  |  |  |
| m1_1 |  | D | D | E | A1 | A2 | A3 | T | WB |  |  |  |  |
| m2_1 |  | D | E | E | A1 | A2 | A3 | T | WB |  |  |  |  |

*FIG. 21B*

| VLIW | MFU1 | GFU |
|---|---|---|
| vliw_1 | | bz r1, label |
| vliw_2 | m1_1 r5, r6, r7 | ld_2 r2, r3, r4 |
| vliw_3 | | ld_3 r4, r8, r9 |

LOCAL STALL CONTROL METHOD AND STRUCTURE IN A MICROPROCESSOR

CROSS-REFERENCE

The present invention is related to subject matter disclosed in the following patent applications:

1. U.S. patent application Ser. No. 09/204,480 entitled, "A Multiple-Thread Processor for Threaded Software Applications", naming Marc Tremblay and William Joy as inventors and filed on even date herewith;
2. U.S. patent application Ser. No. 09/204,584 entitled, "Clustered Architecture in a VLIW Processor", naming Marc Tremblay and William Joy as inventors and filed on even date herewith;
3. U.S. patent application Ser. No. 09/204,481 entitled, "Apparatus and Method for Optimizing Die Utilization and Speed Performance by Register File Splitting", naming Marc Tremblay and William Joy as inventors and filed on even date herewith;
4. U.S. patent application Ser. No. 09/204,536 entitled, "Variable Issue-Width VLIW Processor", naming Marc Tremblay as inventor and filed on even date herewith;
5. U.S. patent application Ser. No. 09/204,586, now U.S. Pat. No. 6,205,543, entitled, "Efficient Handling of a Large Register File for Context Switching", naming Marc Tremblay and William Joy as inventors and filed on even date herewith;
6. U.S. patent application Ser. No. 09/205,121 entitled, "Dual In-line Buffers for an Instruction Fetch Unit", naming Marc Tremblay and Graham Murphy as inventors and filed on even date herewith;
7. U.S. patent application Ser. No. 09/204,781 entitled, "An Instruction Fetch Unit Aligner", naming Marc Tremblay and Graham Murphy as inventors and filed on even date herewith;
8. U.S. patent application Ser. No. 09/204,585 entitled, "Local and Global Register Partitioning in a VLIW Processor", naming Marc Tremblay and William Joy as inventors and filed on even data herewith; and
9. U.S. patent application Ser. No. 09/204,479 entitled, "Implicitly Derived Register Specifiers in a Processor", naming Marc Tremblay and William Joy as inventors and filed on even data herewith.

BACKGROUND OF THE INVENTION

1. Field of the Invention

The present invention relates to processors and computers. More specifically, the present invention relates to stall detection and control systems in a pipelined processor.

2. Description of the Related Art

Processors have long used pipelining to improve operating speed. A pipelined processor executes multiple instructions in parallel in an overlapped manner so that each stage of multiple stages in the pipeline completes a part of an instruction. Throughput of the pipeline relates to the number of instructions that can be processed in a given time interval.

Various conditions reduce the throughput of the pipeline by preventing a next instruction in an instruction stream from executing during a clock cycle. These conditions reduce the performance of the processor from the potential gains of pipelining. The conditions include structural conditions arising from resource conflicts in which functional units of the processor cannot support a combination of instructions in simultaneous overlapped execution. Data dependency conditions arise when an instruction depends on the results of an instruction which has not made the results available in the overlapping of instructions in the pipeline. Control conditions arise from pipelining of branches and other instructions that change the program counter of the processor.

The conditions occasionally necessitate stalling of the pipeline. A stall in a pipelined processor typically is handled by allowing some instructions to proceed while other instructions are delayed. The typical response when an instruction is stalled is to also stall all instructions that are subsequent to the stalled instruction in the pipeline. Instructions that are earlier in the pipeline are not stalled but no new instructions are fetched during the stall.

The handling of stalls includes two events, (2) the detection of the condition causing the stall, and (2) propagation of the stall signal throughout the processor. Both events create a critical timing path in modem fast processors. Stall logic circuits that detect stall conditions generally involves much circuitry, consuming a large amount of area on an integrated circuit die. The stall logic circuits receive signals from functional units located at several locations, often including distant locations, on an integrated circuit chip. The stall interconnections and circuitry therefore include long interconnection wires and extensive control logic, resulting in slow execution times of the processor.

The control logic typically attempts to stall the front end of the pipeline. In some processors, the control logic attempts to stall the entire pipeline. Since the various stages of the pipeline are associated with all aspects of instruction functionality, including instruction fetching, decoding, execution of an entire range of instructions, trapping, writeback, and the like, stall signals are routed across essentially the entire functional layout of the integrated circuit. Therefore, the stall signals are propagated along long wires having lengths over many millimeters. The stall signals are typically propagated the functionally long distances within a single clock cycle. Accordingly, the stall logic is often a critical timing path and cycle time limitation in high-performance processors.

A processor and operating technique are needed that improve execution performance of stall operations.

SUMMARY OF THE INVENTION

A processor implements a local stall functionality in which small, independent circuit units are stalled locally with the condition causing a stall being first detected locally, then propagated to other small independent circuit units. Stall conditions for a functional unit is detected locally with reduced logic circuitry and also without waiting to receive condition information from other functional units that is transmitted over long wires. Local stall logic circuits are distributed over diverse areas of an integrated circuit so that stall conditions are detected locally. A local stall is expanded into a global stall by propagation to logic circuits beyond a local region in subsequent cycles. Local detection of stall conditions and local stalling eliminates many critical paths in the processor.

BRIEF DESCRIPTION OF THE DRAWINGS

The features of the described embodiments are specifically set forth in the appended claims. However, embodiments of the invention relating to both structure and method of operation, may best be understood by referring to the following description and accompanying drawings.

FIGS. 7A–7C are respectively, a schematic block diagram showing an embodiment of a general functional unit, a simplified schematic timing diagram showing timing of a general functional unit pipeline, and a bypass diagram showing possible bypasses for the general functional unit.

FIG. 8 is a simplified schematic timing diagram illustrating timing of media functional unit pipelines.

FIGS. 9A–9C respectively show an instruction sequence table, and two pipeline diagrams illustrating execution of a VLIW group which shows stall operation for a five-cycle pair instruction and a seven-cycle pair instruction.

FIGS. 10A–10C are pipeline diagrams illustrating synchronization of pair instructions in a group.

FIG. 14 is a table that depicts the stalls generated by various functional units within the processor.

FIGS. 20A and 20B are a VLIW packet diagram and a pipeline diagram which respectively illustrate an operation of scoreboard checking with anti-dependency in the same group.

FIGS. 21A, 21B, and 21C are, respectively, a VLIW packet diagram, a pipeline diagram, and a timing diagram which illustrate an operation of updating an E-stage scoreboard entry in the presence of a D-stage stall.

FIGS. 22A and 22B respectively, are a pipeline diagram and a timing diagram that illustrate an operation of updating an E-stage entry in the presence of a mispredict in E-stage.

The use of the same reference symbols in different drawings indicates similar or identical items.

DESCRIPTION OF THE EMBODIMENT(S)

Figure 1:
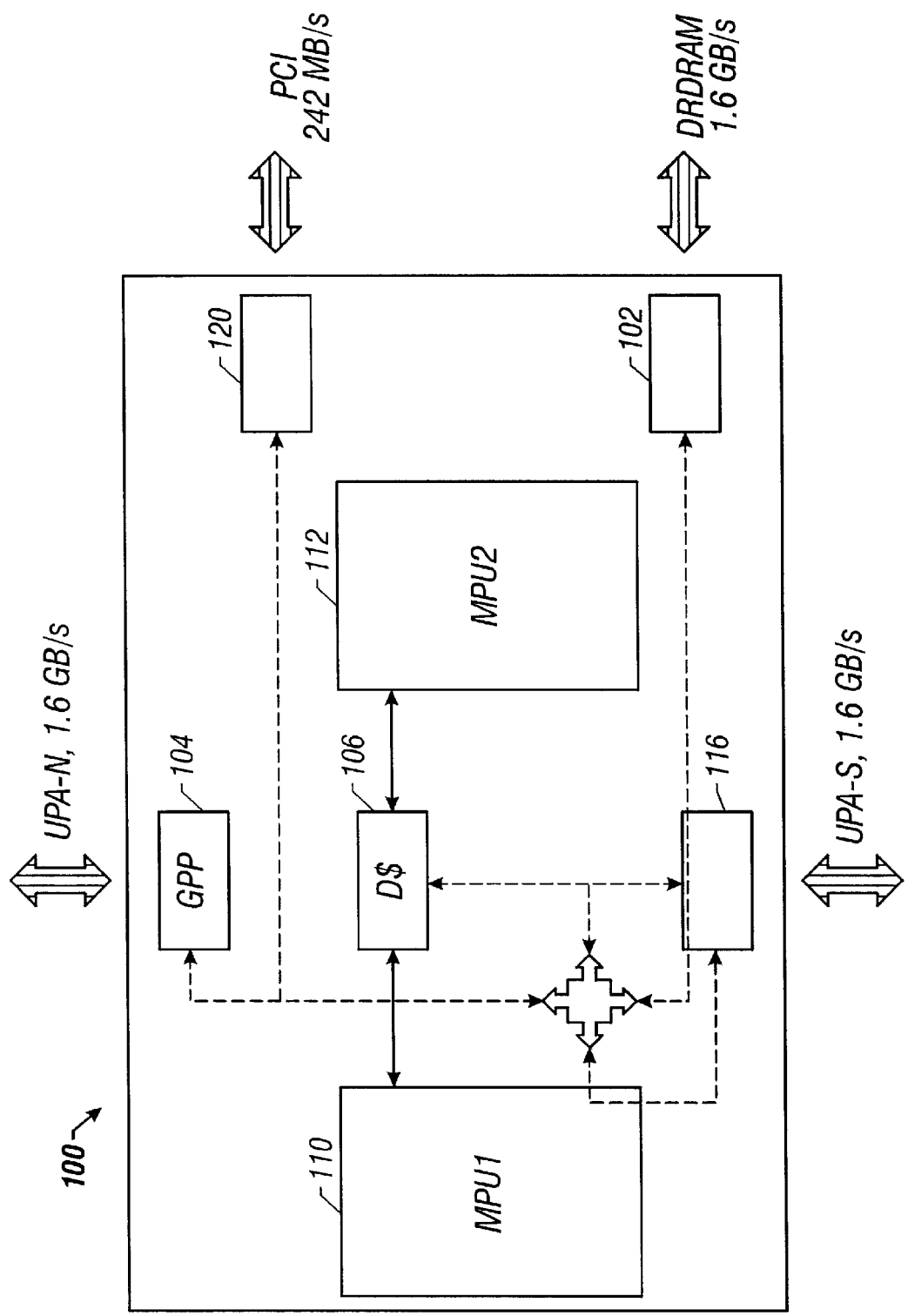
FIG. 1 is a schematic block diagram illustrating a single integrated circuit chip implementation of a processor in accordance with an embodiment of the present invention.

Referring to FIG. 1, a schematic block diagram illustrates a single integrated circuit chip implementation of a processor 100 that includes a memory interface 102, a geometry decompressor 104, two media processing units 110 and 112, a shared data cache 106, and several interface controllers. The interface controllers support an interactive graphics environment with real-time constraints by integrating fundamental components of memory, graphics, and input/output bridge functionality on a single die. The components are mutually linked and closely linked to the processor core with high bandwidth, low-latency communication channels to manage multiple high-bandwidth data streams efficiently and with a low response time. The interface controllers include a an UltraPort Architecture Interconnect (UPA) controller 116 and a peripheral component interconnect (PCI) controller 120. The illustrative memory interface 102 is a direct Rambus dynamic RAM (DRDRAM) controller. The shared data cache 106 is a dual-ported storage that is shared among the media processing units 110 and 112 with one port allocated to each media processing unit. The data cache 106 is four-way set associative, follows a write-back protocol, and supports hits in the fill buffer (not shown). The data cache 106 allows fast data sharing and eliminates the need for a complex, error-prone cache coherency protocol between the media processing units 110 and 112.

The UPA controller 116 is a custom interface that attains a suitable balance between high-performance computational and graphic subsystems. The UPA is a cache-coherent, processor-memory interconnect. The UPA attains several advantageous characteristics including a scaleable bandwidth through support of multiple bused interconnects for data and addresses, packets that are switched for improved bus utilization, higher bandwidth, and precise interrupt processing. The UPA performs low latency memory accesses with high throughput paths to memory. The UPA includes a buffered cross-bar memory interface for increased bandwidth and improved scaleability. The UPA supports high-performance graphics with two-cycle single-word writes on the 64-bit UPA interconnect. The UPA interconnect architecture utilizes point-to-point packet switched messages from a centralized system controller to maintain cache coherence. Packet switching improves bus bandwidth utilization by removing the latencies commonly associated with transaction-based designs.

The PCI controller 120 is used as the primary system I/O interface for connecting standard, high-volume, low-cost peripheral devices, although other standard interfaces may also be used. The PCI bus effectively transfers data among high bandwidth peripherals and low bandwidth peripherals, such as CD-ROM players, DVD players, and digital cameras.

Two media processing units 110 and 112 are included in a single integrated circuit chip to support an execution environment exploiting thread level parallelism in which two independent threads can execute simultaneously. The threads may arise from any sources such as the same application, different applications, the operating system, or the runtime environment. Parallelism is exploited at the thread level since parallelism is rare beyond four, or even two, instructions per cycle in general purpose code. For example, the illustrative processor 100 is an eight-wide machine with eight execution units for executing instructions. A typical "general-purpose" processing code has an instruction level parallelism of about two so that, on average, most (about six) of the eight execution units would be idle at any time. The illustrative processor 100 employs thread level parallelism and operates on two independent threads, possibly attaining twice the performance of a processor having the same resources and clock rate but utilizing traditional non-thread parallelism.

Thread level parallelism is particularly useful for Java™ applications which are bound to have multiple threads of execution. Java™ methods including "suspend", "resume", "sleep", and the like include effective support for threaded program code. In addition, Java™ class libraries are thread-safe to promote parallelism. (Java™, Sun, Sun Microsystems and the Sun Logo are trademarks or registered trademarks of Sun Microsystems, Inc. in the United States and other countries. All SPARC trademarks, including UltraSPARC I and UltraSPARC II, are used under license and are trademarks of SPARC International, Inc. in the United States and other countries. Products bearing SPARC trademarks are based upon an architecture developed by Sun Microsystems, Inc.) Furthermore, the thread model of the processor 100 supports a dynamic compiler which runs as a separate thread using one media processing unit 110 while the second media processing unit 112 is used by the current application. In the illustrative system, the compiler applies optimizations based on "on-the-fly" profile feedback information while dynamically modifying the executing code to improve execution on each subsequent run. For example, a "garbage collector" may be executed on a first media processing unit 110, copying objects or gathering pointer information, while the application is executing on the other media processing unit 112.

Although the processor 100 shown in FIG. 1 includes two processing units on an integrated circuit chip, the architecture is highly scaleable so that one to several closely-coupled processors may be formed in a message-based coherent architecture and resident on the same die to process multiple threads of execution. Thus, in the processor 100, a limitation on the number of processors formed on a single die thus arises from capacity constraints of integrated circuit technology rather than from architectural constraints relating to the interactions and interconnections between processors.

Figure 2:
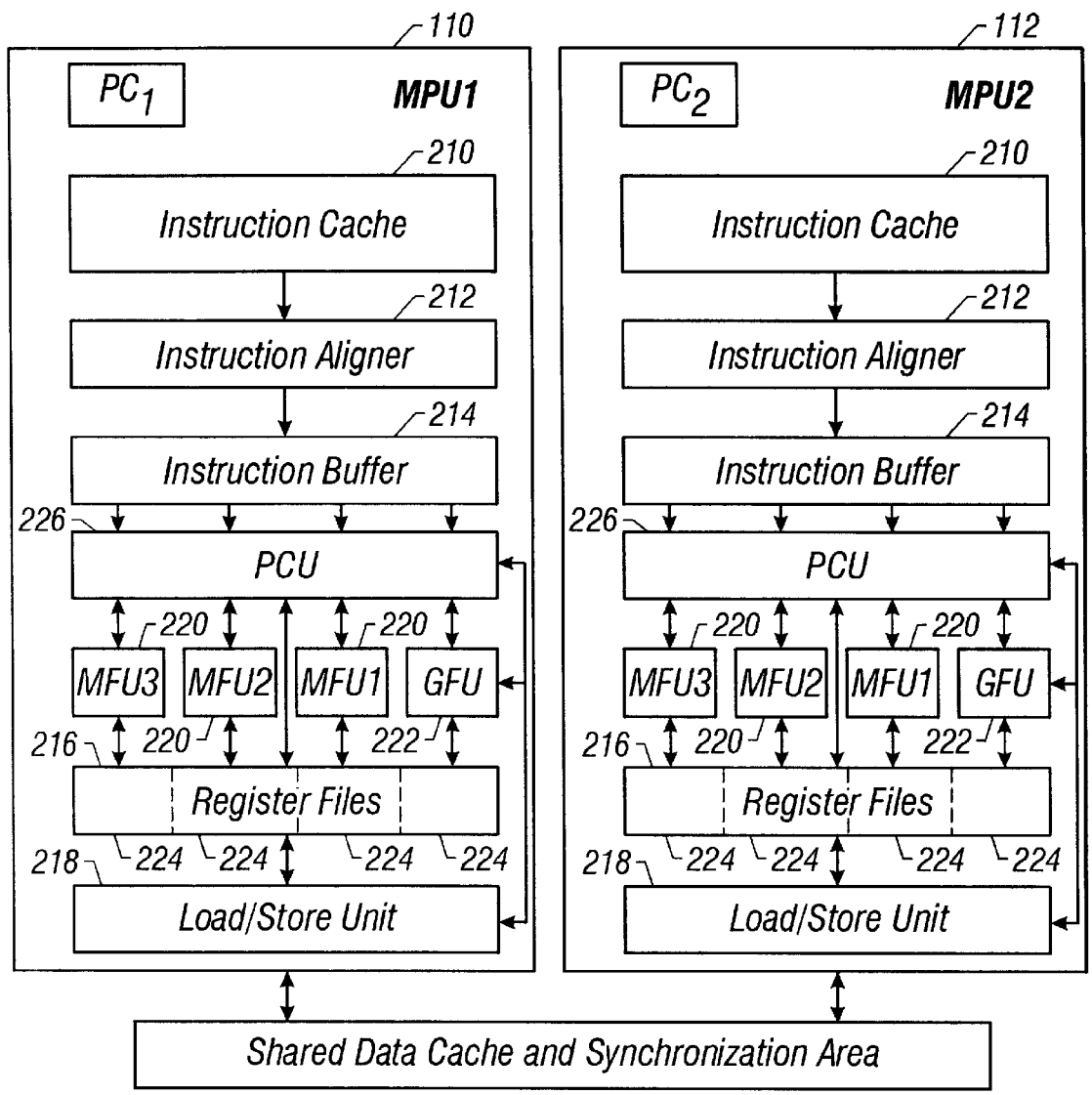
FIG. 2 is a schematic block diagram showing the core of the processor.

Referring to FIG. 2, a schematic block diagram shows the core of the processor 100. The media processing units 110 and 112 each include an instruction cache 210, an instruction aligner 212, an instruction buffer 214, a pipeline control unit 226, a split register file 216, a plurality of execution units, and a load/store unit 218. In the illustrative processor 100, the media processing units 110 and 112 use a plurality of execution units for executing instructions. The execution units for a media processing unit 110 include three media functional units (MFU) 220 and one general functional unit (GFU) 222. The media functional units 220 are multiple single-instruction-multiple-datapath (MSIMD) media functional units. Each of the media functional units 220 is capable of processing parallel 16-bit components. Various parallel 16-bit operations supply the single-instruction-multiple-datapath capability for the processor 100 including add, multiply-add, shift, compare, and the like. The media functional units 220 operate in combination as tightly-coupled digital signal processors (DSPs). Each media functional unit 220 has an separate and individual sub-instruction stream, but all three media functional units 220 execute synchronously so that the subinstructions progress lock-step through pipeline stages.

The general functional unit 222 is a RISC processor capable of executing arithmetic logic unit (ALU) operations, loads and stores, branches, and various specialized and esoteric functions such as parallel power operations, reciprocal square root operations, and many others. The general functional unit 222 supports less common parallel operations such as the parallel reciprocal square root instruction.

The illustrative instruction cache 210 has a 16 Kbyte capacity and includes hardware support to maintain coherence, allowing dynamic optimizations through self-modifying code. Software is used to indicate that the instruction storage is being modified when modifications occur. The 16K capacity is suitable for performing graphic loops, other multimedia tasks or processes, and general-purpose Java™ code. Coherency is maintained by hardware that supports write-through, non-allocating caching. Self-modifying code is supported through explicit use of "store-to-instruction-space" instructions store2i. Software uses the store2i instruction to maintain coherency with the instruction cache 210 so that the instruction caches 210 do not have to be snooped on every single store operation issued by the media processing unit 110.

The pipeline control unit 226 is connected between the instruction buffer 214 and the functional units and schedules the transfer of instructions to the functional units. The pipeline control unit 226 also receives status signals from the functional units and the load/store unit 218 and uses the status signals to perform several control functions. The pipeline control unit 226 maintains a scoreboard, generates stalls and bypass controls. The pipeline control unit 226 also generates traps and maintains special registers.

Each media processing unit 110 includes a split register file 216, a single logical register file including 256 thirty-two bit registers. The split register file 216 is split into a plurality of register file segments 224 to form a multi-ported structure that is replicated to reduce the integrated circuit die area and to reduce access time.

The media processing units 110 are highly structured computation blocks that execute software-scheduled data computation operations with fixed, deterministic and relatively short instruction latencies, operational characteristics yielding simplification in both function and cycle time. The operational characteristics support multiple instruction issue through a pragmatic very large instruction word (VLIW) approach that avoids hardware interlocks to account for software that does not schedule operations properly. Such hardware interlocks are typically complex, error-prone, and create multiple critical paths. A VLIW instruction word always includes one instruction that executes in the general functional unit (GFU) 222 and from zero to three instructions that execute in the media functional units (MFU) 220. A MFU instruction field within the VLIW instruction word includes an operation code (opcode) field, three source register (or immediate) fields, and one destination register field.

Instructions are executed in-order in the processor 100 but loads can finish out-of-order with respect to other instructions and with respect to other loads, allowing loads to be moved up in the instruction stream so that data can be streamed from main memory. The execution model eliminates the usage and overhead resources of an instruction window, reservation stations, a re-order buffer, or other blocks for handling instruction ordering. Elimination of the instruction ordering structures and overhead resources is highly advantageous since the eliminated blocks typically consume a large portion of an integrated circuit die. For example, the eliminated blocks consume about 30% of the die area of a Pentium II processor.

To avoid software scheduling errors, the media processing units 110 are high-performance but simplified with respect to both compilation and execution. The media processing units 110 are most generally classified as a simple 2-scalar execution engine with full bypassing and hardware interlocks on load operations. The instructions include loads, stores, arithmetic and logic (ALU) instructions, and branch instructions so that scheduling for the processor 100 is essentially equivalent to scheduling for a simple 2-scalar execution engine for each of the two media processing units 110.

The processor 100 supports full bypasses between the first two execution units within the media processing unit 110 and has a scoreboard in the general functional unit 222 for load operations so that the compiler does not need to handle nondeterministic latencies due to cache misses. The processor 100 scoreboards long latency operations that are executed in the general functional unit 222, for example a reciprocal square-root operation, to simplify scheduling across execution units. The scoreboard (not shown) operates by tracking a record of an instruction packet or group from the time the instruction enters a functional unit until the instruction is finished and the result becomes available. A VLIW instruction packet contains one GFU instruction and from zero to three MFU instructions. The source and destination registers of all instructions in an incoming VLIW instruction packet are checked against the scoreboard. Any true dependencies or output dependencies stall the entire packet until the result is ready. Use of a scoreboarded result as an operand causes instruction issue to stall for a sufficient number of cycles to allow the result to become available. If the referencing instruction that provokes the stall executes on the general functional unit 222 or the first media functional unit 220, then the stall only endures until the result is available for intra-unit bypass. For the case of a load instruction that hits in the data cache 106, the stall may last only one cycle. If the referencing instruction is on the second or third media functional units 220, then the stall endures until the result reaches the writeback stage in the pipeline where the result is bypassed in transmission to the split register file 216.

The scoreboard automatically manages load delays that occur during a load hit. In an illustrative embodiment, all loads enter the scoreboard to simplify software scheduling and eliminate NOPs in the instruction stream.

The scoreboard is used to manage most interlocks between the general functional unit 222 and the media functional units 220. All loads and non-pipelined long-latency operations of the general functional unit 222 are scoreboarded. The long-latency operations include division idiv,fdiv instructions, reciprocal square root frecsqrt, precsqrt instructions, and power ppower instructions. None of the results of the media functional units 220 is scoreboarded. Non-scoreboarded results are available to subsequent operations on the functional unit that produces the results following the latency of the instruction.

The illustrative processor 100 has a rendering rate of over fifty million triangles per second without accounting for operating system overhead. Therefore, data feeding specifications of the processor 100 are far beyond the capabilities of cost-effective memory systems. Sufficient data bandwidth is achieved by rendering of compressed geometry using the geometry decompressor 104, an on-chip real-time geometry decompression engine. Data geometry is stored in main memory in a compressed format. At render time, the data geometry is fetched and decompressed in real-time on the integrated circuit of the processor 100. The geometry decompressor 104 advantageously saves memory space and memory transfer bandwidth. The compressed geometry uses an optimized generalized mesh structure that explicitly calls out most shared vertices between triangles, allowing the processor 100 to transform and light most vertices only once. In a typical compressed mesh, the triangle throughput of the transform-and-light stage is increased by a factor of four or more over the throughput for isolated triangles. For example, during processing of triangles, multiple vertices are operated upon in parallel so that the utilization rate of resources is high, achieving effective spatial software pipelining. Thus operations are overlapped in time by operating on several vertices simultaneously, rather than overlapping several loop iterations in time. For other types of applications with high instruction level parallelism, high trip count loops are software-pipelined so that most media functional units 220 are fully utilized.

The setup/draw unit 108 is capable of setting up and drawing a triangle every six cycles using graphics technology such as stochastic supersampling, variable resolution regions, samples grouping, and the like. The setup/draw unit 108 attains a fill rate estimated at about 200 million samples per second.

Figure 3:
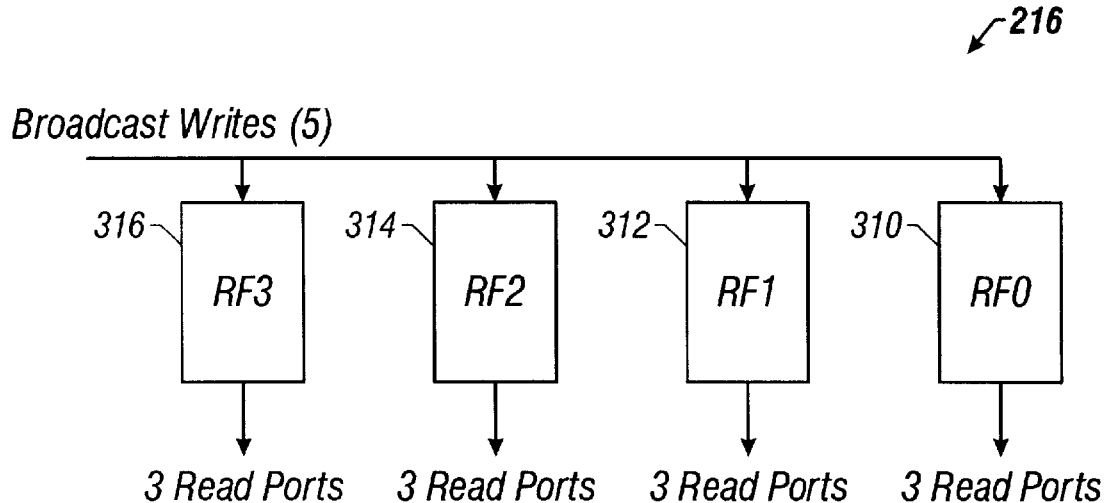
FIG. 3 is a schematic block diagram that illustrates an embodiment of the split register file that is suitable for usage in the processor.

Referring to FIG. 3, a schematic block diagram illustrates an embodiment of the split register file 216 that is suitable for usage in the processor 100. The split register file 216 supplies all operands of processor instructions that execute in the media functional units 220 and the general functional units 222 and receives results of the instruction execution from the execution units. The split register file 216 operates as an interface to the geometry decompressor 104 and supplies data to the setup/draw unit 108. The split register file 216 is the source and destination of store and load operations, respectively.

In the illustrative processor 100, the split register file 216 in each of the media processing units 110 has 256 registers. Graphics processing places a heavy burden on register usage. Therefore, a large number of registers is supplied by the split register file 216 so that performance is not limited by loads and stores or handling of intermediate results including graphics "fills" and "spills". The illustrative split register file 216 includes twelve read ports and five write ports, supplying total data read and write capacity between the central registers of the split register file 216 and all media functional units 220 and the general functional unit 222. Total read and write capacity promotes flexibility and facility in programming both of hand-coded routines and compiler-generated code.

Large, multiple-ported register files are typically metal-limited so that the register area is proportional with the square of the number of ports. A sixteen port file is roughly proportional in size and speed to a value of 256. The illustrative split register file 216 is divided into four register file segments 310, 312, 314, and 316, each having three read ports and four write ports so that each register file segment has a size and speed proportional to 49 for a total area for the four segments that is proportional to 196. The total area is therefore potentially smaller and faster than a single central register file. Write operations are fully broadcast so that all files are maintained coherent. Logically, the split register file 216 is no different from a single central register file However, from the perspective of layout efficiency, the split register file 216 is highly advantageous, allowing for reduced size and improved performance.

The new media data that is operated upon by the processor 100 is typically heavily compressed. Data transfers are communicated in a compressed format from main memory and input/output devices to pins of the processor 100, subsequently decompressed on the integrated circuit holding the processor 100, and passed to the split register file 216.

Splitting the register file into multiple segments in the split register file 216 in combination with the character of data accesses in which multiple bytes are transferred to the plurality of execution units concurrently, results in a high utilization rate of the data supplied to the integrated circuit chip and effectively leads to a much higher data bandwidth than is supported on general-purpose processors. The highest data bandwidth requirement is therefore not between the input/output pins and the central processing units, but is rather between the decompressed data source and the remainder of the processor. For graphics processing, the highest data bandwidth requirement is between the geometry decompressor 104 and the split register file 216. For video decompression, the highest data bandwidth requirement is internal to the split register file 216. Data transfers between the geometry decompressor 104 and the split register file 216 and data transfers between various registers of the split register file 216 can be wide and run at processor speed, advantageously delivering a large bandwidth.

The register file 216 is a focal point for attaining the very large bandwidth of the processor 100. The processor 100 transfers data using a plurality of data transfer techniques. In one example of a data transfer technique, cacheable data is loaded into the split register file 216 through normal load operations at a low rate of up to eight bytes per cycle. In another example, streaming data is transferred to the split register file 216 through group load operations which transfer thirty-two bytes from memory directly into eight consecutive 32-bit registers. The processor 100 utilizes the streaming data operation to receive compressed video data for decompression.

Compressed graphics data is received via a direct memory access (DMA) unit in the geometry decompressor 104. The same compressed graphics data is decompressed by the geometry decompressor 104 and loaded at a high bandwidth rate into the split register file 216 via group load operations that are mapped to the geometry decompressor 104.

Data such as transformed and lit vertices are transferred to the setup/draw unit 108 through store pair instructions which can accommodate eight bytes per cycle mapped to the setup/draw unit 108.

Load operations are non-blocking and scoreboarded so that a long latency inherent to loads can be hidden by early scheduling.

General purpose applications often fail to exploit the large register file 216. Statistical analysis shows that compilers do not effectively use the large number of registers in the split register file 216. However, aggressive in-lining techniques that have traditionally been restricted due to the limited number of registers in conventional systems may be advantageously used in the processor 100 to exploit the large number of registers in the split register file 216. In a software system that exploits the large number of registers in the processor 100, the complete set of registers is saved upon the event of a thread (context) switch. When only a few registers of the entire set of registers is used, saving all registers in the full thread switch is wasteful. Waste is avoided in the processor 100 by supporting individual marking of registers. Octants of the thirty-two registers can be marked as "dirty" if used, and are consequently saved conditionally.

In various embodiments, the split register file 216 is leveraged by dedicating fields for globals, trap registers, and the like.

Figure 4:
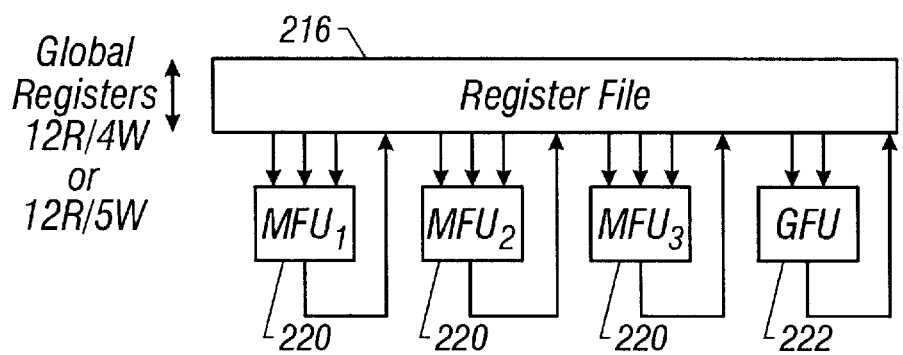
FIG. 4 is a schematic block diagram that shows a logical view of the register file and functional units in the processor.

Referring to FIG. 4, a schematic block diagram shows a logical view of the register file 216 and functional units in the processor 100. The physical implementation of the core processor 100 is simplified by replicating a single functional unit to form the three media functional units 220. The media functional units 220 include circuits that execute various arithmetic and logical operations including general-purpose code, graphics code, and video-image-speech (VIS) processing. VIS processing includes video processing, image processing, digital signal processing (DSP) loops, speech processing, and voice recognition algorithms, for example.

Figure 5:
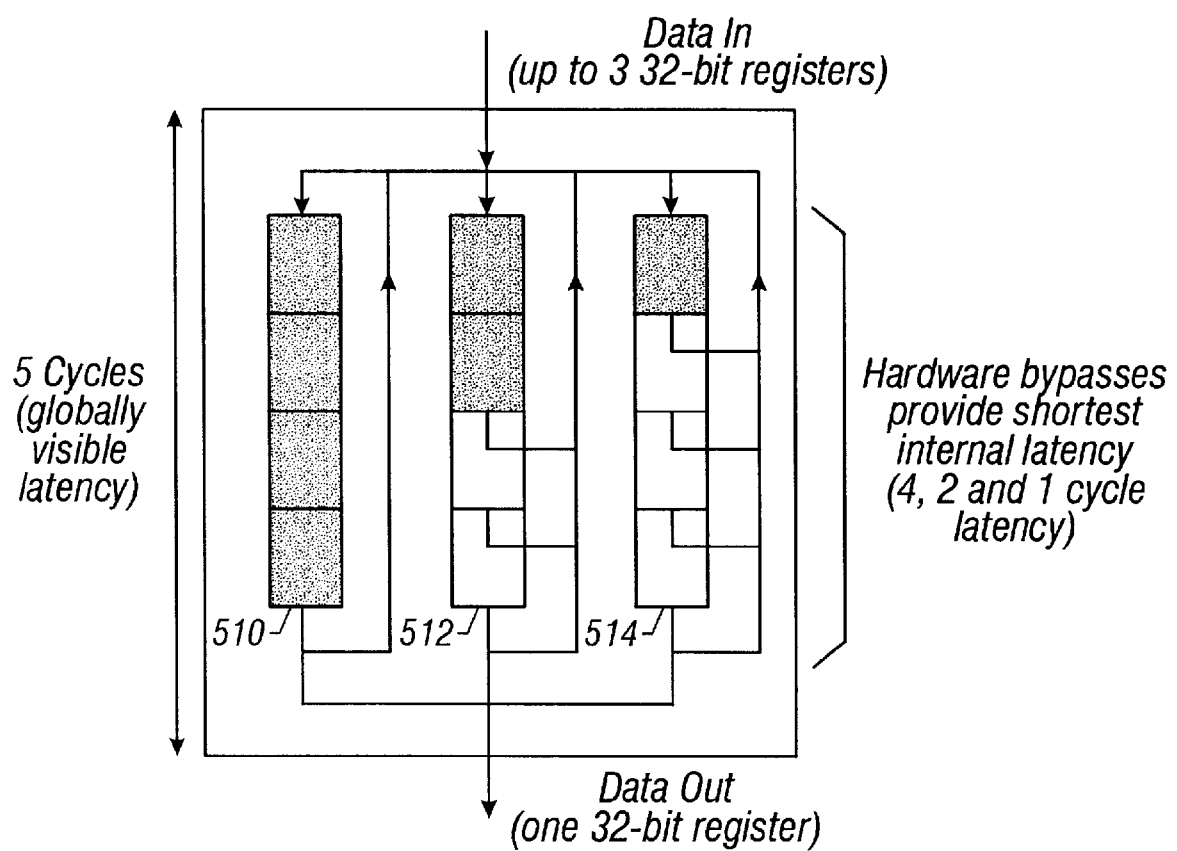
FIG. 5 is a pictorial schematic diagram depicting an example of instruction execution among a plurality of media functional units.

Referring to FIG. 5, a simplified pictorial schematic diagram depicts an example of instruction execution among a plurality of media functional units 220. Results generated by various internal function blocks within a first individual media functional unit are immediately accessible internally to the first media functional unit 510 but are only accessible globally by other media functional units 512 and 514 and by the general functional unit five cycles after the instruction enters the first media functional unit 510, regardless of the actual latency of the instruction. Therefore, instructions executing within a functional unit can be scheduled by software to execute immediately, taking into consideration the actual latency of the instruction. In contrast, software that schedules instructions executing in different functional units is expected to account for the five cycle latency. In the diagram, the shaded areas represent the stage at which the pipeline completes execution of an instruction and generates final result values. A result is not available internal to a functional unit a final shaded stage completes. In the example, media processing unit 110 instructions have three different latencies—four cycles for instructions such as fmuladd and fadd, two cycles for instructions such as pmuladd, and one cycle for instructions like padd and xor.

Although internal bypass logic within a media functional unit 220 forwards results to execution units within the same media functional unit 220, the internal bypass logic does not detect incorrect attempts to reference a result before the result is available.

Software that schedules instructions for which a dependency occurs between a particular media functional unit, for example 512, and other media functional units 510 and 514, or between the particular media functional unit 512 and the general functional unit 222, is to account for the five cycle latency between entry of an instruction to the media functional unit 512 and the five cycle pipeline duration.

Figure 6:
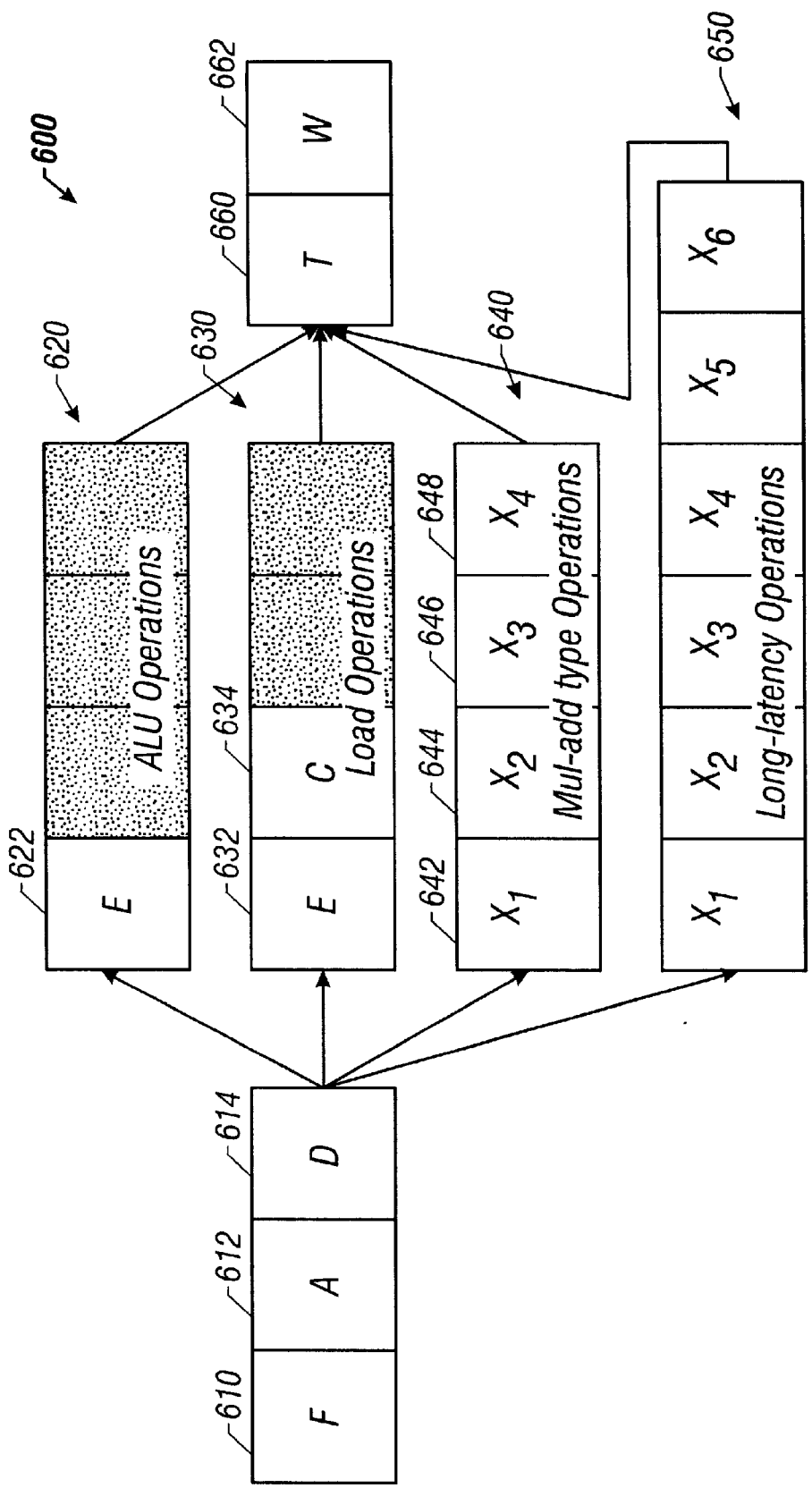
FIG. 6 is a schematic timing diagram that illustrates timing of the processor pipeline.

Referring to FIG. 6, a simplified schematic timing diagram illustrates timing of the processor pipeline 600. The pipeline 600 includes nine stages including three initiating stages, a plurality of execution phases, and two terminating stages. The three initiating stages are optimized to include only those operations necessary for decoding instructions so that jump and call instructions, which are pervasive in the Java™ language, execute quickly. Optimization of the initiating stages advantageously facilitates branch prediction since branches, jumps, and calls execute quickly and do not introduce many bubbles.

The first of the initiating stages is a fetch stage 610 during which the processor 100 fetches instructions from the 16Kbyte two-way set-associative instruction cache 210. The fetched instructions are aligned in the instruction aligner 212 and forwarded to the instruction buffer 214 in an align stage 612, a second stage of the initiating stages. The aligning operation properly positions the instructions for storage in a particular segment of the four register file segments 310, 312, 314, and 316 and for execution in an associated functional unit of the three media functional units 220 and one general functional unit 222. In a third stage, a decoding stage 614 of the initiating stages, the fetched and aligned VLIW instruction packet is decoded and the scoreboard (not shown) is read and updated in parallel. The four register file segments 310, 312, 314, and 316 each holds either floatingpoint data or integer data. The register files are read in the decoding (D) stage.

Following the decoding stage 614, the execution stages are performed. The two terminating stages include a trap-handling stage 660 and a write-back stage 662 during which result data is written-back to the split register file 216.

Figure 7A:
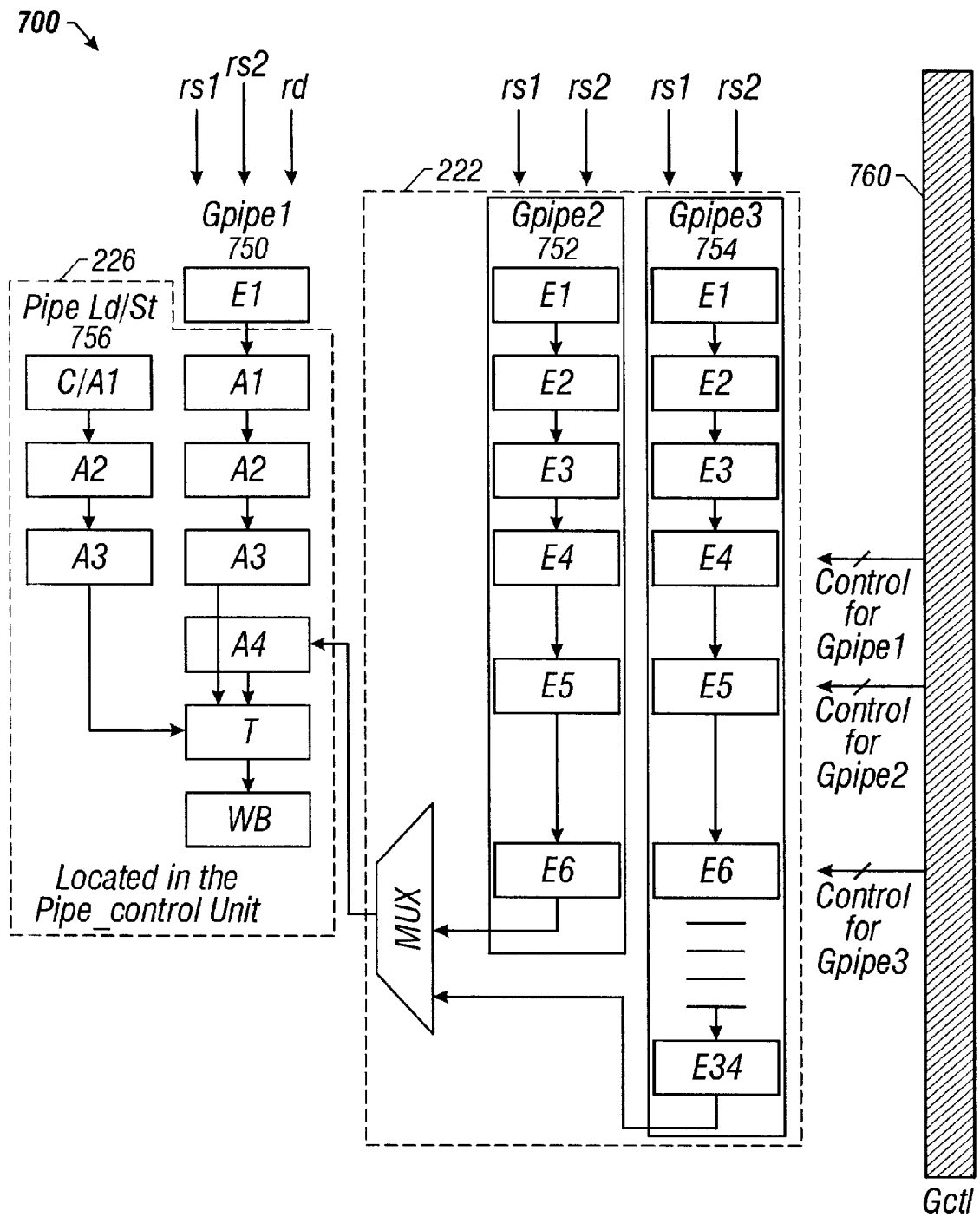
Figure 7B:
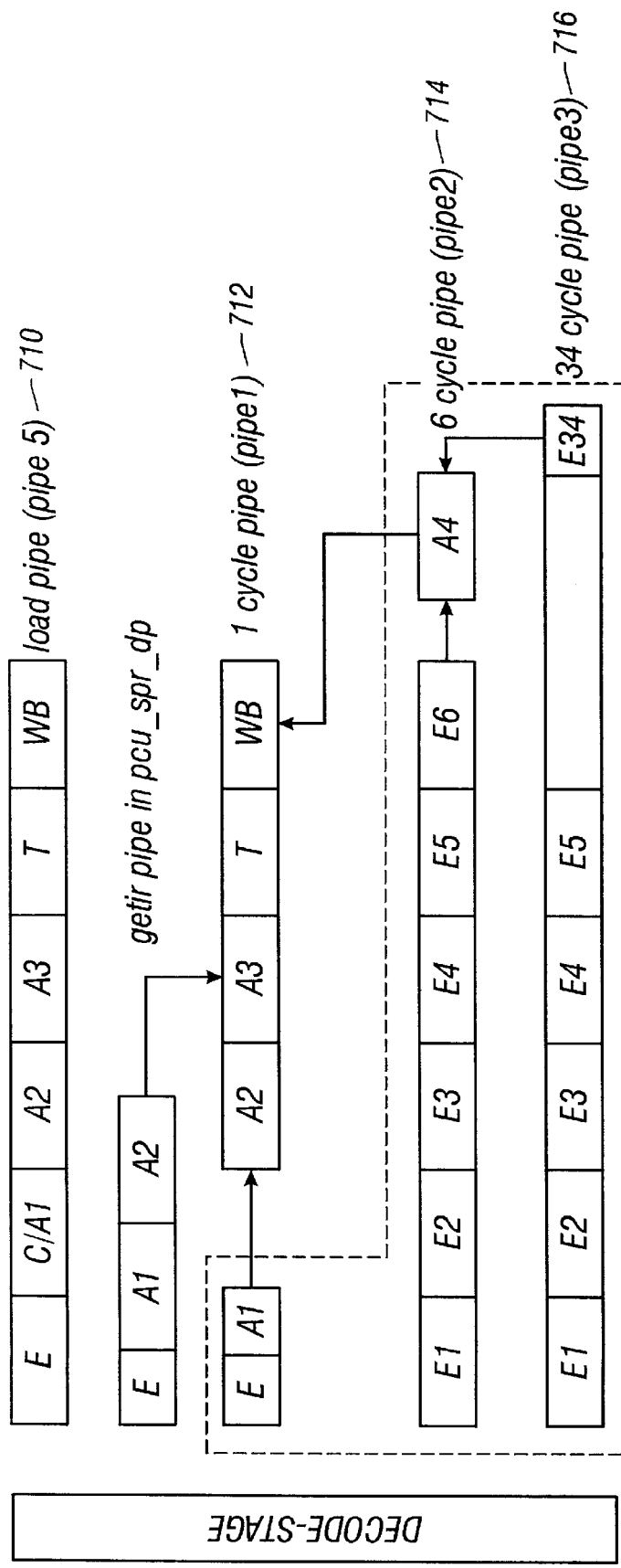

Referring to FIGS. 7A, 7B, and 7C respectively, a schematic block diagram shows an embodiment of the general functional unit 222, a simplified schematic timing diagram illustrating timing of general functional unit pipelines 700, and a bypass diagram showing possible bypasses for the general functional unit 222. The general functional unit 222 supports instructions that execute in several different pipelines. Instructions include single-cycle ALU operations, four-cycle getir instructions, and five-cycle setir instructions. Long-latency instructions are not fully pipelined. The general functional unit 222 supports six-cycle and 34-cycle long operations and includes a dedicated pipeline for load/store operations.

The general functional unit 222 and pipeline control unit 226, in combination, include four pipelines, Gpipe1 750, Gpipe2 752, Gpipe3 754, and a load/store pipeline 756. The load/store pipeline 756 and the Gpipe1 750 are included in the pipeline control unit 226. The Gpipe2 752 and Gpipe3 754 are located in the general functional unit 222. The general functional unit 222 includes a controller 760 that supplies control signals for the pipelines Gpipe1 750, Gpipe2 752, and Gpipe3 754. The pipelines include execution stages (En) and annex stages (An).

Results from instructions executed by the general functional unit 222 and media functional units 220 are not immediately written to the register file segments 224. The results are staged in the annexes and broadcast to the register file segments 224 in T-stage if no trap is present. The register file segments 224 latch the results locally and update the registers in the next clock cycle. The annex contains destination rd specifiers of all instructions from the A1-stage and onward. The annex maintains valid bits for each stage of the pipeline. The annex also contains priority logic to determine the most recent value of a register in the register file.

The general functional unit pipelines 700 include a load pipeline 710, a 1-cycle pipeline 712, a 6-cycle pipeline 712, and a 34-cycle pipeline 714. Pipeline stages include execution stages (E and En), annex stages (An), trap-handling stages (T), and write-back stages (WB). Stages An and En are prioritized with smaller priority numbers n having a higher priority.

The processor 100 supports precise traps. Precise exceptions are detected by E4/A3 stages of media functional unit and general functional unit operations. One-cycle operations are stages in annex and trap stages (A1, A2, A3, T) until all exceptions in one VLIW group are detected. Traps are generated in the trap-generating stages (T). When the general functional unit 222 detects a trap in a VLIW group, all instructions in the VLIW group are canceled.

When a long-latency operation is in the final execute stage (E6 stage for the 6-cycle pipeline 712 or E34 stage for the 34-cycle pipeline 714), and a valid instruction is under execution in the A3-stage of the annex, then the long-latency instruction is held in a register, called an A4-stage register, inside the annex and is broadcast to the register file segments 224 only when the VLIW group under execution does not include a one-cycle GFU instruction that is to be broadcast.

Results of long-latency instructions are bypassed to more recently issued GFU and MFU instructions as soon as the results are available. For example, results of a long-latency instruction are bypassed from the E6-stage of a 6-cycle instruction to any GFU and MFU instruction in the decoding (D) stage. If a long-latency instruction is stalled by another instruction in the VLIW group, results of the stalled long-latency instruction are bypassed from the annex (A4) stage to all instructions in the general functional unit 222 and all media functional units 220 in the decoding (D) stage.

Data from the T-stage of the pipelines are broadcast to all the register file segments 224, which latch the data in the writeback (WB) stage before writing the data to the storage cells.

The bypass diagram shown in FIG. 7C shows operation of the bypasses in the general functional unit 222. The pipelines 700 are arranged in levels, shown arranged from right to left, with level_1 having a higher priority than level_2 and so on. Among the stages in the same level, no difference in priority is enforced. For the execution stages (E), if a load is followed by a gfu instruction with the same destination specifier rd, then the higher priority gfu instruction enters the E-stage when the load is in a 1dx1 stage of an annex (A). The annexes include compare-match logic that enforce the bypass priority among instructions.

The diagram assumes that the load returns in cycle 3 and enters 1dx1-stage in cycle 4 and 1dx2-stage in cycle 5. Inst1 is unstalled in cycle 4. In cycle 5, when inst2 is in D-stage, the only bypass younger than the load in 1dx2-stage is in the bypass from E-stage of gfu/mfu1 instructions. Therefore, 1dx2-stage is one level below (level_2) the E-stage of the gfu/mfu1 instructions.

Similarly, in cycle 6, when the load is in 1dx3-stage, the stages younger than 1dx_3 stage but having the same destination specifiers rd are E/A1 stages of gfu and mfu1 instructions. Therefore, 1dx_3 stage is one level below (level_3) the A1-stages of gfu/mfu1 instructions in bypass. Similarly, 1dx4_stage is one level below A2-stage (level_4) in bypass priority. When the load is in 1dx1-stage (in cycle 4), no younger instructions with the same rd specifier as the load are possible due to hardware interlock with the load. Therefore, 1dx1-stage has the highest priority (level_1) in bypass.

Priority is similarly enforced for long latency instructions.

The annexes include multiplexers that select matching stages among the bypass levels in a priority logic that selects data based on priority matching within a priority level. The annexes include compare logic that compares destination specifiers rd against each of the specifiers rs1, rs2, and rd.

In the illustrative embodiment, the bypass logic for the first media functional unit 220 mfu1 is the same as the bypass logic for the general functional unit 222 since full bypass between the gfu and mfu1 is supported. Annexes for the second and third media functional units 220 (mfu2 and mfu3) are mutually identical but simpler than the gfu/mfu1 bypass logic since full bypass is not supported for mfu2/mfu3. In other embodiments, full bypass may be implemented in all positions.

Referring to FIG. 8, a simplified schematic timing diagram illustrates timing of media functional unit pipelines 800 including single precision and integer pipelines. The media functional units 220 execute single-precision, double-precision, and long operations. The media functional units 220 are connected to the register file segments 224 via 32-bit read ports so that two cycles are used to read the source operands for 64-bit double-precision and long operations. A "pair instruction" is any MFU instruction that utilizes a second instruction to either read or write the lower or higher order pair of a source operand or destination operand. The second instruction is not part of the instruction stream from the instruction memory but rather is generated in hardware. The media functional units 220 support 1-cycle 810, 2-cycle 812, and 4-cycle 814 instructions on single precision and integer operations.

The media functional units 220 execute pair instructions including two-cycle latency instructions that read two long integers or two doubles and generate a single integer result, two-cycle latency instructions that read two long integers and write to a long integer, five-cycle latency instructions that read two double or one double operands and generate a double precision result, and seven-cycle latency instructions that read two double precision operands and generate a double-precision result. When a five cycle or seven cycle latency instruction is included in a VLIW group, all other instructions in the group are stalled in E-stage so that all instructions in the VLIW group read T-stage simultaneously. Precise exceptions are thus supported even for five-cycle and seven-cycle latency instructions.

When a second instruction of a pair is generated by hardware for a media functional unit 220, instructions in a next issued VLIW group are stalled for one cycle so that the second instruction of the pair does not have a conflict with the instruction in the next VLIW group for writing to the register file segment 224.

For efficient operation, when a VLIW group contains one or more pair instructions and the next subsequent VLIW group in a sequence is vacant in the pair instruction positions, then the instructions in the subsequent VLIW group in the nonvacant positions are executed along with the initial VLIW group. A group position is vacant when no instruction is included or the instruction is a 'nop', any instruction which writes to register 0 and has no side effects. The pipeline control unit 226 detects a vacant position in a VLIW group by analyzing the opcode and the destination register rd of the instruction.

Referring to FIGS. 9A–9C, an instruction sequence table and two pipeline diagrams illustrate execution of VLIW groups including a five-cycle pair instruction and a seven-cycle pair instruction. FIG. 9A is an instruction sequence table showing five VLIW groups (VLIW_n) and instructions executed in the media functional units 220 (MFU3, MFU2, and MFU1) and in the general functional unit 222 (GFU) for sequentially issued instruction groups n=1 to 5.

FIG. 9B shows instruction mfu1_1 in the MFU1 position of the group vliw_1 as a five-cycle latency pair instruction and instruction mfu1_2 in the MFU1 position of the group vliw_2 as a valid instruction and not a 'nop' so that instruction gfu_1 in the GFU position of the group vliw_1 is stalled in the E-stage for one cycle. Stalling of the instruction gfu_1 causes gfu_1 to reach the T-stage at the same time as the instruction mfu1_1. The first and second inherent instruction of a pair instruction are atomic instructions between which no traps or interrupts can occur. All errors or exceptions caused by the double or long pair instructions are detected when the instruction reaches the final Execute (E4) stage. If an error or exception is detected in the E4-stage of the pair instruction, both the first and inherent second instruction of the pair are canceled.

In the illustrative example shown in FIG. 9B, if a trap occurs in cycle 7, both the first and inherent second instruction of mfu1_1 are canceled. If a trap occurs in cycle 8 due to external interrupt, asynchronous error, instructions in group vliw_2, or the like, then the inherent second instruction of mfu1_1 is allowed to finish execution and only the instructions in group vliw_2 are canceled.

FIG. 9C shows instruction mfu1_1 in the MFU1 position of the group vliw_1 as a seven-cycle latency pair instruction and no pair instructions in group vliw_2. The gfu_1 instruction in the group containing the seven-cycle latency pair stalls for four cycles in the E-stage.

Referring to FIGS. 10A–10C, pipeline diagrams show examples illustrating synchronization of pair instructions in a group. If a two-cycle latency pair instruction is included in group vliw_1, then group vliw_2 stalls in D-stage for a cycle if the position in group vliw_2 corresponding to the two-cycle latency pair instruction is not vacant.

If a five-cycle or seven-cycle latency pair instruction is included in group vliw_1, other instructions in group vliw_1 stall in E-stage so that all instructions in group vliw_1 read the trap-generating (T) stage simultaneously.

Instructions in group vliw_2 stall for an additional cycle in E-stage only if a port conflict of the inherent second instruction of a pair and an instruction in group vliw_2 is scheduled to occur.

In the example shown in FIG. 10A, instruction mfu1_1 is a seven-cycle latency pair instruction and instruction mfu2_2 in group vliw_2 is a five-cycle latency pair instruction.

In the example shown in FIG. 10B, in group vliw_1 instruction mfu1_1 is a two-cycle latency pair instruction, instruction mfu2_1 is a five-cycle latency pair instruction, and instruction mfu3_1 is a seven-cycle latency pair instruction. Group vliw_2 includes at least one valid MFU instruction which is not a five-cycle or seven-cycle latency pair instruction.

In the example shown in FIG. 10C, in group vliw_1 instruction mfu2_1 is a five-cycle latency pair instruction and instruction mfu3_1 is a seven-cycle latency pair instruction, but instruction mfu1_1 is not a two-cycle latency pair instruction. The difference between the examples shown in FIG. 10B and FIG. 10C is that instructions in group vliw_2 in the latter case stall in the E-stage in cycle 6 to avoid port conflicts of the inherent second instructions of instructions mfu2_1 and mfu3_1 with mfu2_2 and mfu3_2, respectively.

Referring to FIGS. 11A, 11B, 11C, and 11D, respective schematic block diagrams illustrate the pipeline control unit 226 segments allocated to all of the functional units GFU, MFU1, MFU2, and MFU3. The pipeline control unit 226 imposes several scheduling rules that apply to bypass between instructions in a single VLIW group. Full bypass is implemented between instructions executed by functional units GFU and MFU1 so that bypass rules are identical for bypass from results of pair instructions in MFU1 to more recently issued instructions executed in the GFU and MFU1 functional units. For other cases, an additional one cycle penalty is imposed for bypass from a pair instruction to more recently issued instructions in other groups. The scheduling rules are imposed by control units allocated to the general functional unit 222 and the media functional units 220. A pcu_gf control unit (pcu_gf_ctl 1110) is the control block for instructions executing in the general functional unit 222. Similarly, pcu_mf1_ctl 1120, pcu_mf2_ctl 1122, and pcu_mf3_ctl 1124 are control blocks for mfu1, mfu2, and mfu3, respectively. The pcu/functional unit control blocks generate D-stage stalls, generate D-stage bypasses for "alu_use_immediate" cases and for generating multiplexer select signals for E-stage bypasses. The control blocks for the various functional units are positioned adjacent to the scoreboard datapath associated to the particular functional unit. The pcu control units include a partial decoder, such as gfu partial decoder 1130 and mfu partial decoders 1132, 1134, and 1136.

The pipeline control unit 226 also include a plurality of internal registers (ir), many of which are not accessible by a user. One internal register of the pipeline control unit 226 is a processor control register (PCR) that controls power management, instruction and data cache enables, pipeline enable, and branch predict taken enable.

The pcu control units perform various functions including qualifying scoreboard hits with immediate bits, sending operation type signals to the load/store unit 218, and handling various instructions including getir, setir, sethi, jmpl, membar, and prefetch. Signals generated by the decoder include a gfu__imm signal that designates whether source rs2 is immediate, a gfu__load signal that designates whether a gfu instruction is a load, a gfu__1dg signal that identifies whether the instruction is a group load, and a gfu__1dpair signal that designates whether the instruction is a paired instruction within a load pair. Generated signals further include a gfu__store signal that identifies a store instruction, a gf__stpair signal the indicates whether the gfu instruction is a store pair instruction, and a gfu__cas signal which indicates that the gfu instruction is a cas instruction. A gfu__prefetch signal indicates the gfu instruction is a prefetch. A gfu__call signal designates a call instruction with r2 as a destination specifier. A gfu__branch signal designates a branch instruction with the rd field as a source specifier. The gfu__nop signal designates a nop. A gfu__illegal signal identifies an illegal instruction. A gfu__privilege signal designates a privileged instruction. A gfu__sir signal indicates a software initiated reset instruction. A gfu__softrap signal identifies a softrap instruction. Signals including gfu__sethi, gfu__setlo, and gfu__addlo designate sethi instructions. A gfu__long signal indicates a long latency instruction. Signals including gfu__setir, gfu__getir, gfu__setir_psr, and gfu__memissue respectively designate setir, getir, setir to PSR, and membar instructions.

The pcu__gf__ctl 1110 generates D-stage and E-stage stalls of the general functional unit 222, generates signals to hold the D-stage of the gfu instruction, source, and destination operands.

The pcu__gf__ctl 1110 controls full bypass between the general functional unit 222 (gfu) and the media functional unit 220 (mfu1). The pcu__gf__ctl 1110 generates bypass signals in several circumstances. An ALU use immediate bypass is generated if any of the source specifiers of the gfu instruction depends on the results of an immediately preceding 1 cycle gfu or mfu1 instruction. If a source specifier of any gfu instruction in E-stage awaits load data, then the pcu__gf__ctl 1110 asserts appropriate select signals to select the data returning from either the load/store unit 218 or the data cache 106. If the source specifier of any gfu instruction in D-stage is dependent on a previous long latency instruction, then the pcu__gf__ctl 1110 asserts appropriate select signals to select the long latency data. If an E-stage stall occurs and any source operand is not dependent on a load data return, then the pcu__gf__ctl 1110 asserts appropriate signals to hold the data the source operand has already bypassed.

The pcu__mf1__ctl 1120 is similar to the pcu__gf__ctl 1110 and performs functions including partial decoding of the mfu1 instruction to supply and maintain the D-stage opcode of the mfu1 instructions. The pcu__mf1__ctl 1120 generates all stalls of the mfu1 instruction and recirculating the D-stage mfu1 instruction. The pcu__mf1__ctl 1120 generates bypass selects for mfu1 instructions and sends load dependency information to the mfu1l annex so that the annex selects a proper bypass if the instruction is stalled in D-stage with load dependency. The pcu__mf1__ctl 1120 detects bypasses for ALU-use immediate cases and generates the inherent second instruction of a paired mfu1 instruction. The mf1 also generates synchronizing stalls for mfu instructions.

In the illustrative embodiment, pcu__mf2__ctl 1122 and pcu__mf3__ctl 1124, control blocks for mfu2 and mfu3 instructions, are the identical but differ from pcu__mf1__ctl 1120 because full bypass is not supported between mfu2/mfu3 and gfu.

A first rule applies for a VLIW group N that contains a five-cycle or seven-cycle latency pair instruction of the format 'pair ax, bx, cx' and the inherent second instruction of the pair has the format 'helper ay, by, cy' where ax/ay, bx/by, and cx/cy are even-odd pairs. If (1) at least one pair instruction is included in either of the next two VLIW groups N+1 or N+2, or (2) a valid MFUx instruction in the VLIW group N+1 is included in the position corresponding to the position of a pair instruction in the VLIW group N, then (i) any more recently issued pair instruction within the same functional unit is to be at least four groups apart (VLIW group N+4) to bypass the results of the pair instruction in VLIW group N, and (ii) any more recently issued instruction that uses the results cx/cy is to be at least four groups apart (VLIW group N+4). Otherwise, any more recently issued instruction that uses the results of the pair instruction is to be at least five groups apart (VLIW group N+5).

A second rule applies when a VLIW position holds a pair instruction in VLIW group N and a vacancy in VLIW group N+1. Instructions in VLIW group N+1 are not to write to the same destination register rd as the inherent second instruction of the pair in VLIW group N.

A third rule applies for a two-cycle latency pair instruction that generates integer results (dcmp and lcmp instructions) in a VLIW group N. Instructions in VLIW group N+1 can bypass results of the dcmp and lcmp operations.

A fourth rule applies for a two-cycle latency pair instruction that generates a 64-bit result (1add/1sub) in a VLIW group N. Any instruction in VLIW group N+1 can bypass the results of the pair instruction in VLIW group N.

A fifth rule specifies that an assembler is expected to schedule the correct even and odd register specifiers since pipeline control unit 226 logic does not check to determine whether the even or odd register specifiers are correct. Pipeline control unit 226 logic reads the source operands that are specified in the instruction and sends the source operands to the functional unit for execution. For pair instructions, logic in the pipeline control unit 226 then inverts bit[0] of the source operands and sends the newly determined source operands to the functional unit for execution in the next cycle. The results returned by the functional unit after N-cycle, where N is the latency of the pair instruction, are written into the rd specifier specified in the instruction. Results returned in cycle N+1 are written to the rd specifier with bit[0] inverted. If a pair instruction has any of the source or destination operands specified as r0, then the source/destination operands of the inherent second instruction of a pair are also r0.

The pipeline control unit 226 supports full bypass between the general functional unit 222 and MFU1 of the media functional units 220. Thus results of instructions executed in MFU1 are available in the same cycle to instructions in the D-stage in GFU and MFU1 units. However, results of instructions executed in MFU2 and MFU3 are available to the GFU and MFU1 functional units only after results enter the T-stage. Specifically, a GFU instruction that uses the result of a one, two or four-cycle MFU2 instruction has to be at least five cycles later. GFU and MFU1 instructions have a two-cycle best case load-use penalty. MFU2 and MFU3 instructions have a three-cycle best case load-use penalty. A GFU instruction having an output dependency with a previous load and the load is a data cache hit returning data in the A1-stage has a three cycle penalty.

Figure 11A:
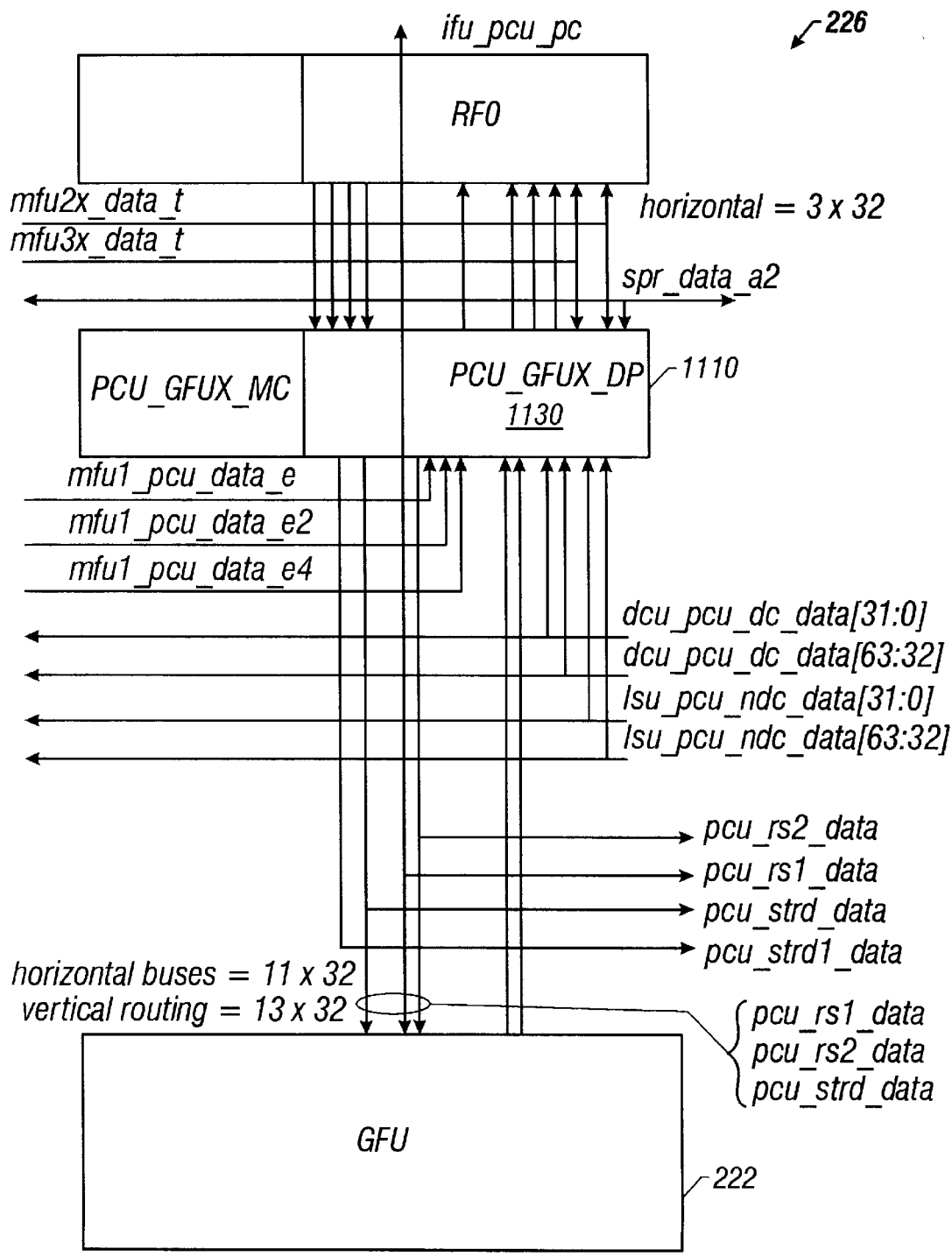
FIGS. 11A, 11B, 11C, and 11D are respective schematic block diagrams illustrating the pipeline control unit segments allocated to all of the functional units GFU, MFU1, MFU2, and MFU3.
Figure 11B:
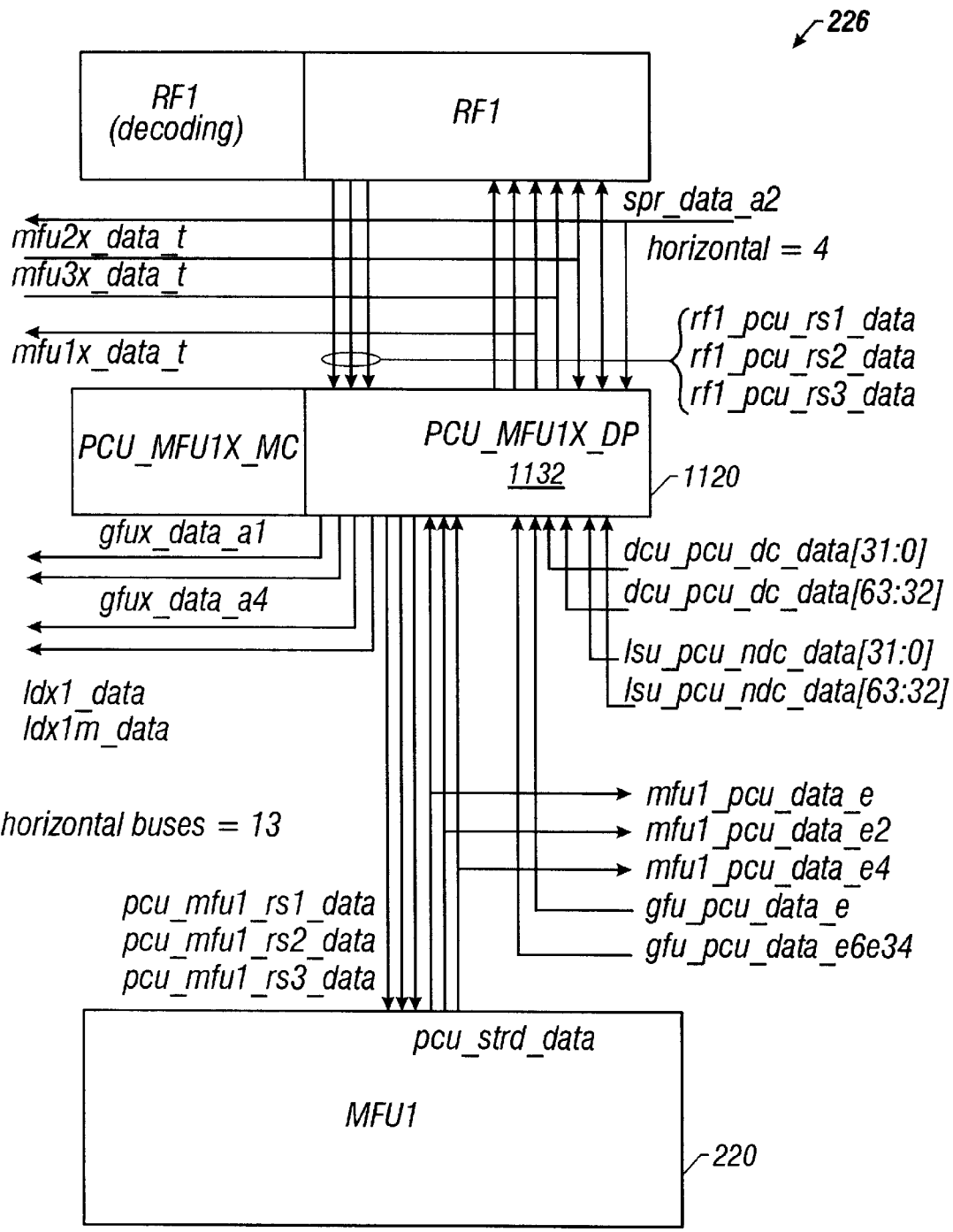
Figure 11C:
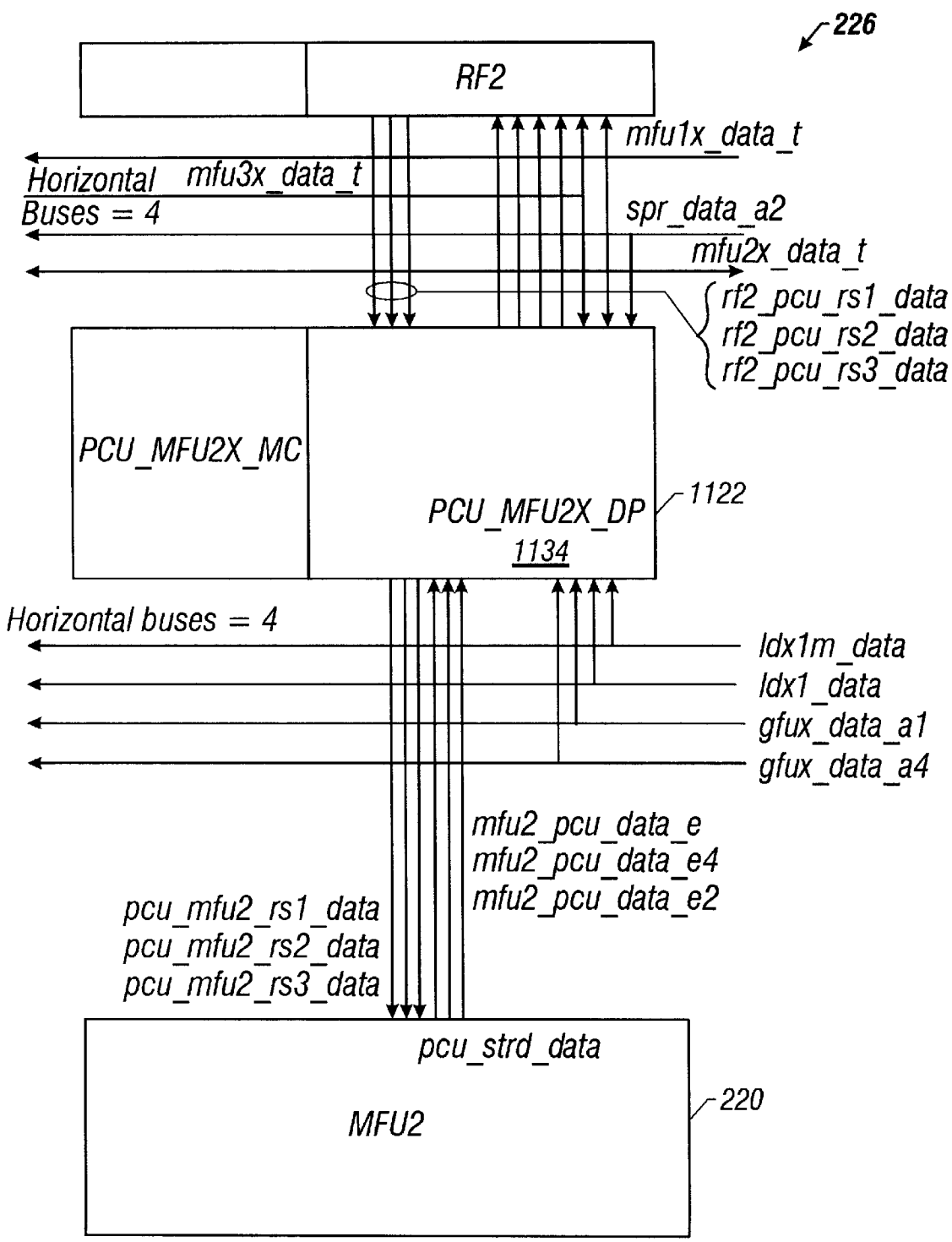
Figure 11D:
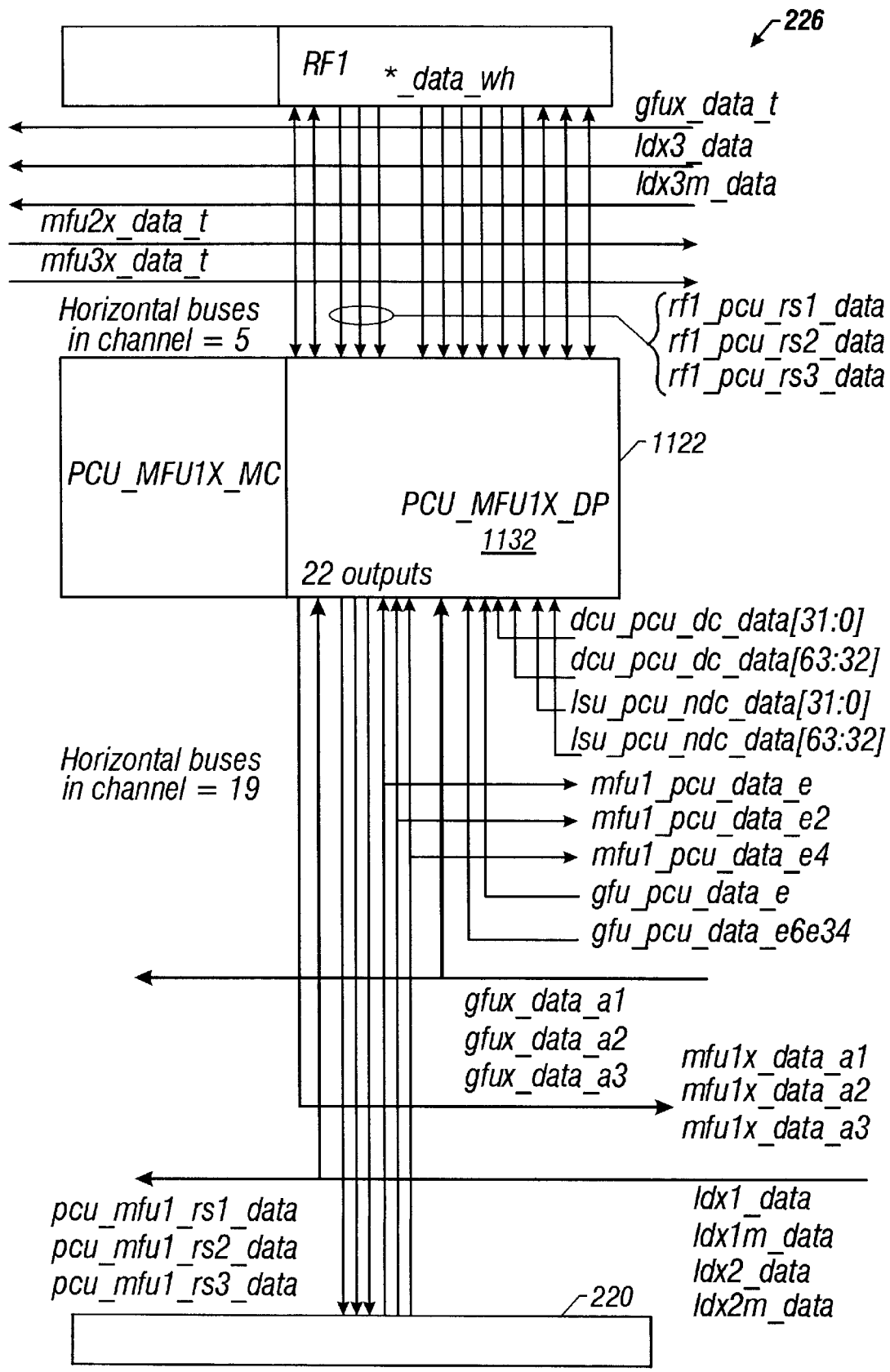

All pipiline stages from which the source operands of a GFU instruction bypass data are maintained in a pipeline controll unit—general functional unit interface 1110 shown in FIG. 11A. Similar interfaces are included for each of the media functional units 220, MFU1, MFU2, and MFU3 shown in FIGS. 11B, 11C, and 11C, respectively.

Figures 12, 13A, 13B:
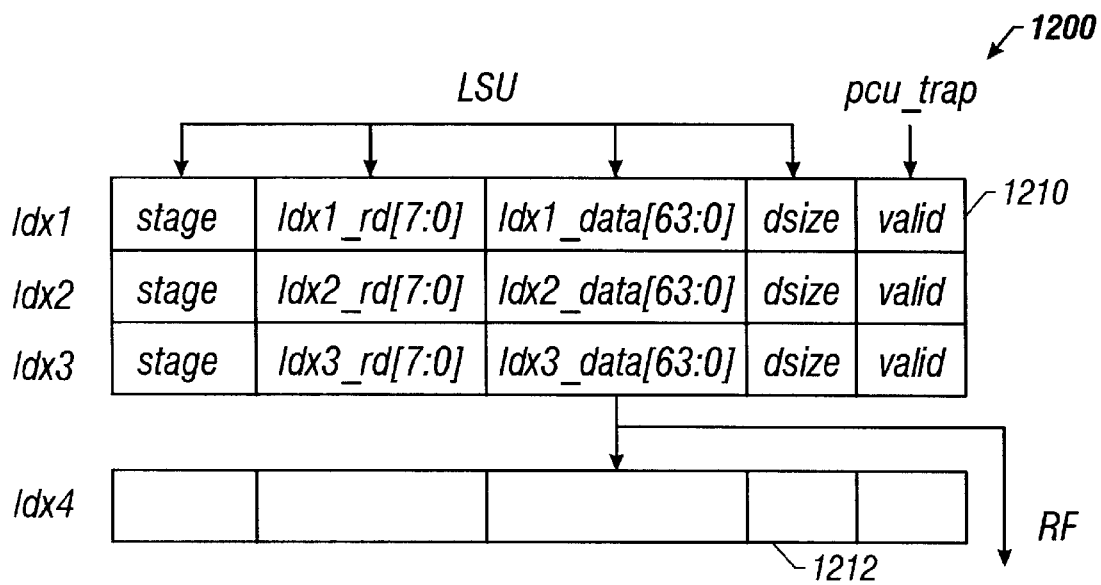
FIG. 12 is a schematic block diagram that illustrates a load annex block within the pipeline control unit.
FIGS. 13A–13B are pipeline diagrams show examples illustrating the operation of E-stage stalls.

Referring to FIG. 12, a schematic block diagram illustrates a load annex block 1200 within the pipeline control unit 226. The load annex block 1200 includes a storage 1210 for holding data, read specifiers, data size, and a valid bit. Read data is stored in a separate FIFO 1212 in the annexes. The read data is simply shifted down every cycle. Every cycle, stage bits are shifted to the right by one position.

If a trap or flush occurs in a cycle N, all entries with a nonzero count are invalidated before the entries are shifted down in cycle N+1.

Load addresses are calculated in E-stage of the pipeline. The data cache 106 is accessed in C/A1-stage of the pipeline. If the load hits the data cache 106, data returns from the load/store unit 218 after the load/store unit receives data from either the main memory (not shown) or interface (not shown). Data from the load/store unit 218 is received in any of annex (A1)—write-back (WB) stages or the write-back stage (WB).

Load data enters the annexes and is staged in the annexes for three cycles before being broadcast to the register file 216. The load operation is staged in the 1dx1–1dx4 stages in the annex. By staging the load for three cycles, all precise exceptions caused by either the load or other instructions in the same VLIW group cause cancellation of the load. During the 1dx4 stage, the load is written to the register file 216. Data cannot be accessed and written into the register file 216 in the same cycle so an additional stage is inserted to hold the data while the data is written.

When load data enters the annex, the age of the data is indicated by stage bits (A1–T). If a trap is detected before the load reaches the write-back (WB) stage, the load is invalidated.

Once the data returns from the load/store unit 218, the data enters a 1dx FIFO (not shown) in all the annexes. The annex has four entries. Since the 64-bit write report in each of the register file segment 224 is dedicated for loads, the FIFO is shifted down one entry each clock cycle.

The scoreboard is a storage structure that maintains information regarding unfininshed loads and long latency operations in the general functional unit 222. The scoreboard allows in-order processing with non-blocking memory. The scoreboard supplies a hardware interlock between any unfinished load or long-latency operation and a more recently issued instruction that has data/output dependency with the load or long-latency operation.

The scoreboard had E-stage entries for holding information relating to loads and long-latency operations when the operations transition from the D-stage to the E-stage. The E-stage entry includes a field for storing the destination register specifier of the load or long-latency instruction, a to designate that the instruction is a load instruction or a long-latency instruction, a field to indicate whether the load instruction is a pair instruction, and a field to indicate a load group (1dg) instruction. The E-stage entry also includes a field to indicate whether the destination register rd is 0×02 since a "CALL" instruction writes the return address into register r2. The register r2 is not specified explicitly in the instruction so that, for an unfinished load writing to r2, then the "CALL" instruction is to stall until the load finishes updating register r2. The E-stage entry also includes a field to indicate whether the E-stage entry is valid, which occurs in the E-stage. When the instruction transitions from the E-stage to the A1-stage, the E-stage entry becomes invalid and either the load entries or the long latency entry of the scoreboard is updated.

The number of entries allocated for loads is equal to the number of entries in the load buffer of the load/store unit 218. The processor 100 allows one load hit under four messes requiring five load entries in the scoreboard. fields in the load entries include an 8-bit register for holding the destination address (rd) specifier of the load instruction, a field to indicate a group load (1dg), a field to indicate a load pair or load long, a field stage representing the age in the scoreboard of the instruction, a group load count indicating the number of finished loads in a group load, a field to indicate whether the entry is valid, and a field to indicate whether the load is to register r2. Stage bits are shifted right by one position each cycle. If a trap is detected before the load reaches write-back stage, the entry is invalidated.

If a long latency operation is not finished before a more recently issued long latency operation is received in the general funtional unit 222, the pipeline control unit 226 stalls the pipeline in the decoding (D) stage.

Instructions from all functional units (GFU, MFU1, MFU2, and MFU3) access the scoreboard in the decode (D) stage to check for dependencies. Usage of a single centralized scoreboard structure would require all source and destination register specifiers of all instructions to be routed to the scoreboard, increasing routing congestion and degrading scoreboard access time. Therefore, the pipeline control unit 226 replicates the scoreboard for each functional unit, but with all pointers to write and update or reset the entries in all scoreboards generated in a single control block within the pipeline control unit 226 and routed to all scoreboards.

When a pair instruction enters the decode (D) stage of a media functional unit 220, the data and output dependencies of the inherent second instruction of the pair are also checked in the same cycles. Accordingly, seven read ports are used for the scoreboards of one media functional unit 220 including three source operands and one destination operand for the first instruction and two source operands and one destination operand for the inherent second instruction of the pair.

Instructions executed in the general functional unit 222 use four read ports.

When a load returns from either the load/store unit 218 or data cache 106, the valid signal is asserted later in the cycle so that insufficient time remains in the cycle to generate reset pointers to invalidate the corresponding entry in the scoreboard. If a load returns in cycle N, the entry to be invalidated or updated is computed in cycle N+1 and the updated valid or 1dg count bits are visible in cycle N+2.

A load enters the scoreboard at the first invalid entry corresponding to loads.

When the load buffer becomes full, the load/store unit 218 asserts a buffer full flag in E-stage of the last load which filled the load buffer. The signal becomes late in the cycle due to the transfer time in the round trip path between the pipeline control unit 226 and the load/store unit 218. The pipeline control unit 226 latches the buffer full flag and stalls any load or setir instruction in the E-stage. The load/store unit 218 uses the load buffer to stage the data written to internal registers by the setir instruction.

When the load enters the scoreboard, the encoded index is sent to the load/store unit 218. When the load/store unit 218 returns the load, the load/store unit 218 also sends back the index to the scoreboard. The entry corresponding to the index is accessed to reset the scoreboard. The index-based scoreboard facilitates resetting of the scoreboard by avoiding comparison of the load_rd address with all the rd specifiers in the scoreboard to find the entry which is to be reset or updated. A load can be entering one entry in the scoreboard while another load is updating or invalidating another entry in the same cycle.

A load returning from the load/store unit 218 resets the scoreboard for a normal load or a 1dpair or 1dg which is updating the last pair of registers. For the 1dg instruction which occurs during updating of the registers, only the group load count is changed.

The entry corresponding to a long latency operation is reset when the long latency operation enters A4 or T stage without being stalled.

Instructions access the scoreboard in D-stage with the rd specifier of the load returned in the previous cycle compared with the rs/rd specifiers of the current instruction to determine whether the load has returned. A dependency occurs only if a scoreboard match occurs and the data does not return from the load/store unit 218 or data cache 106 in the previous cycle.

The scoreboard is checked for data dependency and output dependency. For a load group instruction, only part of the source specifier bit are compared and the compare signal is disqualified if the load group count bits indicate the source specifier has already returned. For a load pair, part of the bits of the source specifier are compared to the destination specifier held in the scoreboard. For other instructions, all bits of the source specifier are compared to the destination specifier in the scoreboard.

For long latency instructions, data dependency is checked by comparing the destination specifier of the long entry against the source specifier. For output dependency of all instructions other than gfu load group, load pair, and call instructions, all bits of the long entry destination specifier are compared against the source specifier of the instruction. For the gfu load group, load pair, and call instructions, only part of the bits of the long entry destination specifier are compared against the source specifier of the instruction.

All matches from long entry are disqualified for gfu and mfu1 instructions if the long latency entry is in a final execute stage in the cycle since gfu and mfu1 instructions can bypass the results of long latency operations from the final execute stages.

Results of long latency operations enter an A4-stage register in the annexes. Instructions executed in mfu2 and mfu3 can bypass results held in the A4-stage register.

Several definitions are set forth for describing stalls. The term "matching a load entry" refers to a scoreboard hit in which the data has not yet returned from the data cache 106 or the load/store unit 218. Source specifiers for the media functional units (mfu) 220 are rs1, rs2, and rs3, except for pair instructions in which the source specifiers are rs1, rs2, rs1h, and rs2h. Source specifiers for the general functional unit (gfu) 222, except for branches and conditional moves, are rs1 and rs2. Source specifiers for stores are rs1, rs2, and rd. Source specifiers for branches are rd. Source specifiers for conditional move (cmove) instructions are rs1, rs2, and rd.

Decoder stage (D-stage) stalls for instructions executed in the general functional unit 222 occur under several conditions including the occurrence of an output dependency when a previous load is unfinished. A D-stage stall occurs when an output dependency occurs with a long-latency entry when the long-latency entry is not in the final execute stage of the cycle. A D-stage stall occurs when the rd/rs specifier for the instruction matches a scoreboard entry, a condition termed a "load use immediate/ long use immediate case".

A D-stage stall also occurs when the instruction in the D-stage is a long-latency instruction and a valid long-latency entry already exists in the scoreboard where the long-latency entry in the scoreboard does not reset the scoreboard in that cycle either because the instruction associated with the long-latency entry has not finished or is finished but held in a hold register due to a port conflict.

A D-stage stall also results when the processor 100 is in a step mode that is part of a debug functionality. In the step mode, all instructions in one VLIW group stall in the D-stage until the pipelines are empty. Following the stall, data for the source operands is received from the register file segments 224 and execution proceeds.

D-stage stalls for media functional unit 220 instructions of mfu1 are the same as D-stage stalls for general functional unit 222 instructions except that mfu1 instructions stall in the D-stage for all data dependencies and output dependencies of the inherent second instruction of a pair. Media functional unit 220 instructions of mfu2 and mfu3 stall in the D-stage for any source/destination specifier match in the scoreboard.

For various instructions, generation of a D-stage stall includes accessing the scoreboard for a load or long-latency dependency for all rs/rd specifiers, then qualifying scoreboard matches and ORing the scoreboard matches. The time for D-stage stall generation lasts for more than half the clock cycle.

To preserve the VLIW nature of instructions, even though each instruction in a VLIW group may enter the E-stage at different cycles, all instructions in the group wait in the E-stage until the full VLIW group has entered the E-stage. Accordingly, the instructions stall in the E-stage until the entire VLIW group is available for execution. Each instruction stalls in the E-stage for a number of cycles that is generally independent of the operation of other individual instructions within the group. When an instruction is waiting in the E-stage for other instructions in the group, the waiting instruction generates a local E-stage stall signal (gf_local_stalle or mf_local stall).

In addition to the E-stage stall, instructions executed in the general functional unit 222 also stall for the cases of (i) a load use dependency with a previous load, (ii) a gfu instruction with load or store buffer full, (iii) a stall for synchronizing long latency pair gfu instructions, (iv) stalls to avoid port conflicts, (v) stalls to handle load-use dependencies, (vi) a "membar" instruction, and (vii) a processor in a step mode of the load/store unit 218. The membar instruction is a memory access instruction that specifies that all memory reference instructions that are already issued must be performed before any subsequent memory reference instructions may be initiated.

For the load use dependency with a previous load, if a gfu or mfu1 instruction enters the E-stage with a load dependency, the instruction does not assert the load dependency E-stage stall until all other sub instructions of the VLIW group enter the E-stage, but the instruction does bypass the load data returning from the load/store unit 218.

Another stall condition occurs when the general functional unit 222 executes an instruction such as load, setir, prefetch, or cas, and the load buffer is full. Alternatively, the general functional unit 222 executes a store or cas instruction and the store buffer is full, in which case the gfu instruction also generates an E-stage stall. The load/store unit 218 sends a "pcu-1su loadbuffer full" signal and a "1su-pcu store buffer full" signal to the pipeline control unit 226. The pipeline control unit 226 latches the signals and uses the signals during the E-stage to generate stalls.

An instruction executed by the general functional unit 222 stalls in E-stage for either one cycle or three cycles so that the instructions reach the T-stage simultaneously with five cycle and seven cycle latency pair instructions in the same VLIW group.

E-stage stalls are also invoked to avoid port conflicts. If a group N+1 includes a valid instruction in a position of the media functional units 220 for which the instruction is a 7 cycle or 5 cycle pair instruction in the group N, then all instructions in the group N+1 stall for an additional cycle in the E-stage so that the mfu instruction in the group N+1 does not finish in the same cycle as the inherent second instruction of the pair. The stall signal generated is a "previous pair stall" (gf_prev_pair_stall_e).

An E-stage stall is generated when the instruction in the first position of the media functional units 220 (mfu1) has a load-use dependency with a previous unfinished load instruction. The mfu1 instruction asserts the stall (mf1_1d_stalle) only after all the instructions in the VLIW group reach the E-stage.

Referring to FIGS. 13A and 13B, pipeline diagrams show several examples illustrating the operation of E-stage stalls. When an instruction executed in the general functional unit 222 is a membar instruction and the load/store buffers are not empty, the membar instruction stalls in the E-stage until the load/store unit 218 asserts a pcu/1su load/store buffer empty signal. The pipeline diagram shown in FIG. 13A shows the case in which the load/store buffers are empty before the first load. In the example, the first load is a data cache hit returning data in the C/A1-stage.

The pcu/1su load/store buffer empty signal is asserted late in cycle 2 at the same time the load is sent to the load/store unit 218. The pipeline control unit 226 latches the signal and monitors the signal in cycle 3 to stall the membar instruction. The data cache hit data returns in cycle 3. The load/store unit 218 asserts the pcu/1su load/store buffer empty signal late in cycle 4. The pipeline control unit 226 asserts the stall (signal "mbar_staller") in cycle 5.

A further stall condition, illustrated in FIG. 13B, occurs when the processor 100 is in an "1su step" debug mode. In the debug mode, only one load/store operation is allowed at any time. Therefore an instruction directed to the load/store unit 218 such as a store, load, cas, prefetch, or setir instruction, stalls in the E-stage until the load/store buffers become empty. A first setir instruction asserts the debug feature. The illustrative example shows that the load/store buffers are empty before the first load, a data cache hit that returns data in the A1-stage. A second instruction such as a load, a store, a setir to the load/store unit 218, a prefetch, or a cas instruction stalls in the E-stage for two cycles.

Referring to FIG. 14, a table depicts the stalls generated by various functional units within the processor 100.

Figure 15A:
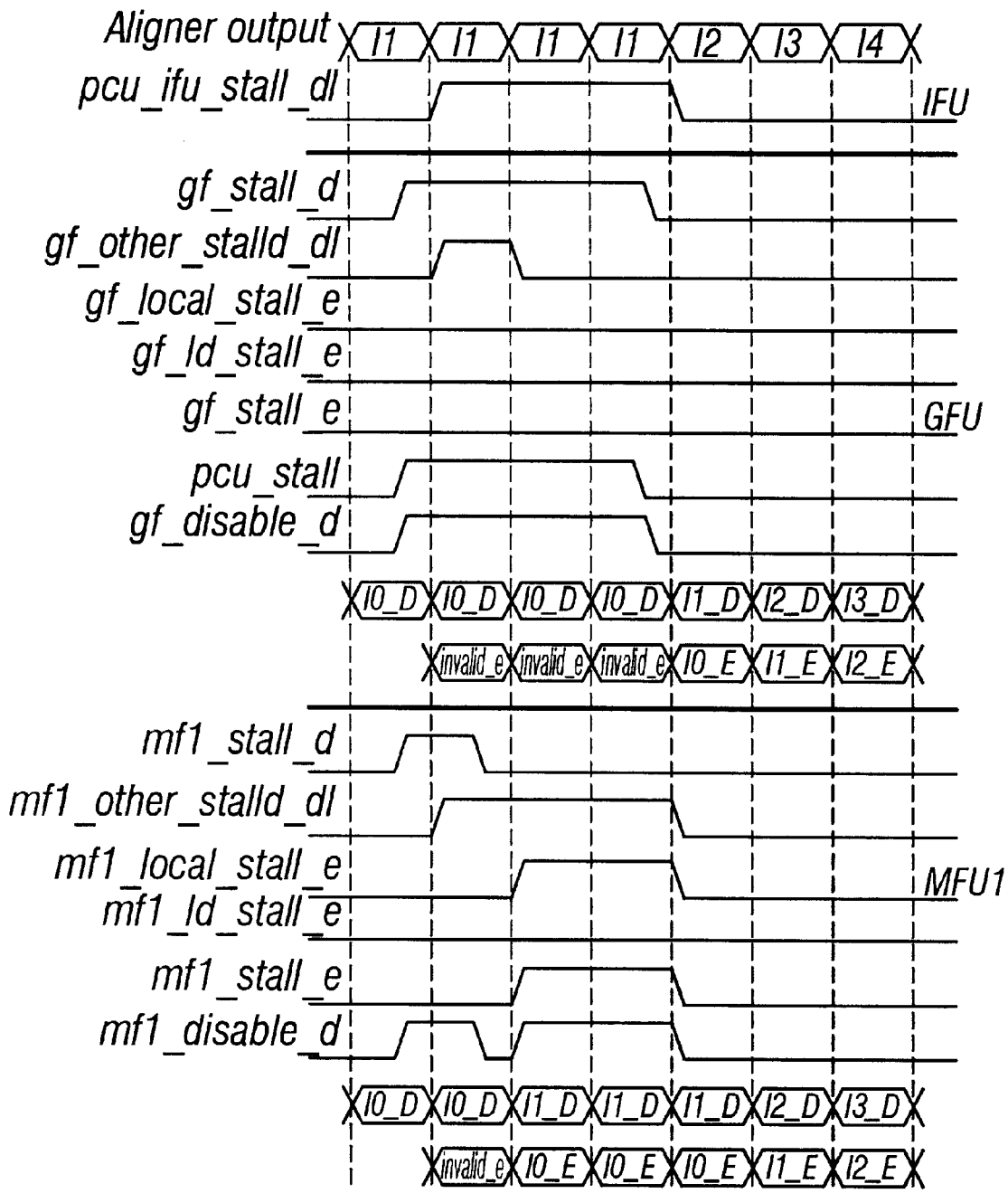
FIGS. 15A–15E are a plurality of timing diagrams that illustrate the timing of generation of stall signals.

Referring to FIGS. 15A–15E, several timing diagrams illustrate the timing of generation of stall signals. FIG. 15A is a timing diagram that illustrates the timing of a local stall in which an mnful instruction is stalled in the E-stage awaiting a pending gfu instruction.

Figure 15B:
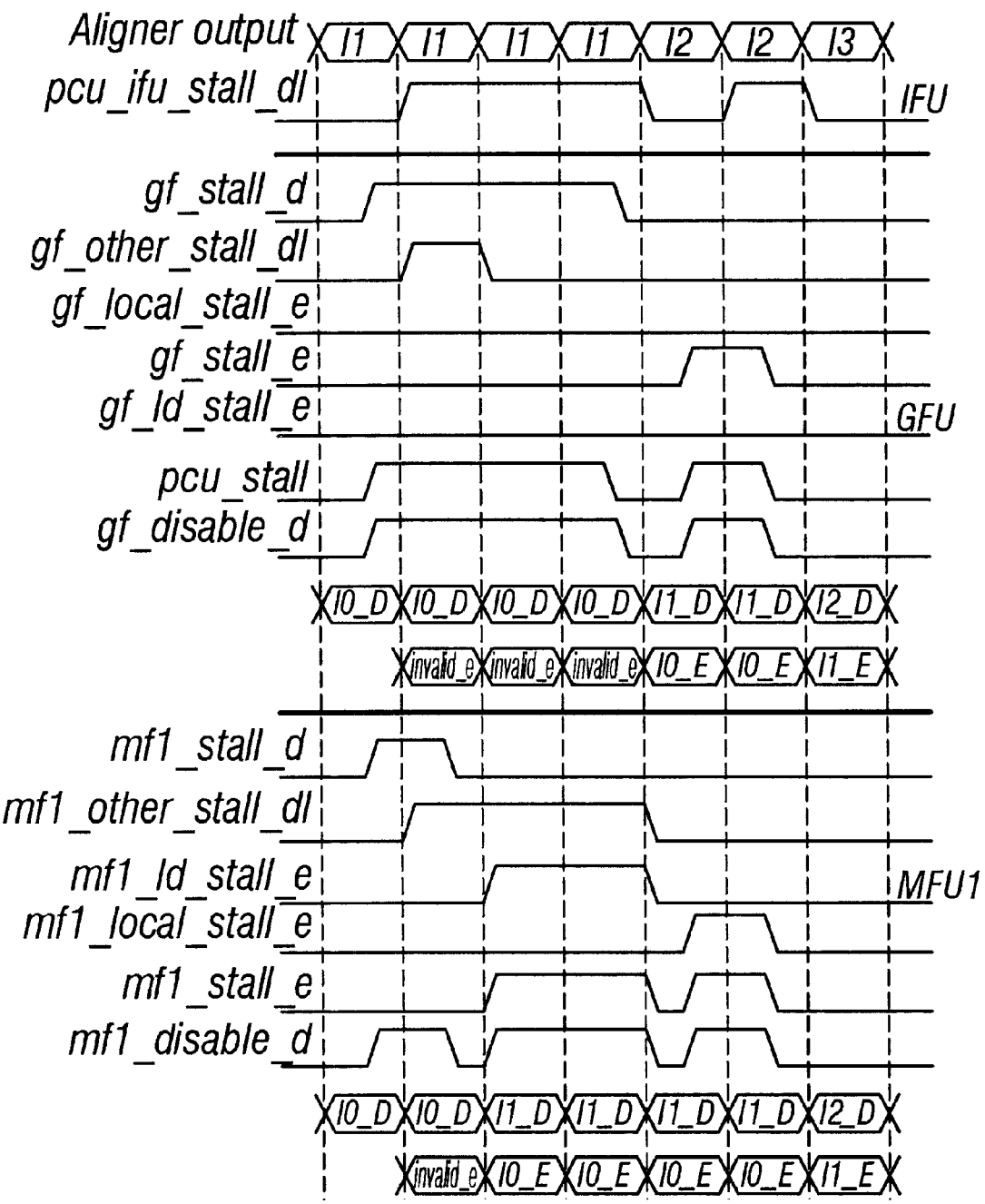

Referring to FIG. 15B, an instruction (mfu1) executing in the media functional unit 220 waits in the E-stage for an instruction (gfu) executing in the general functional unit 222. The media functional unit 220 does not generate any load dependency stalls.

Figure 15C:
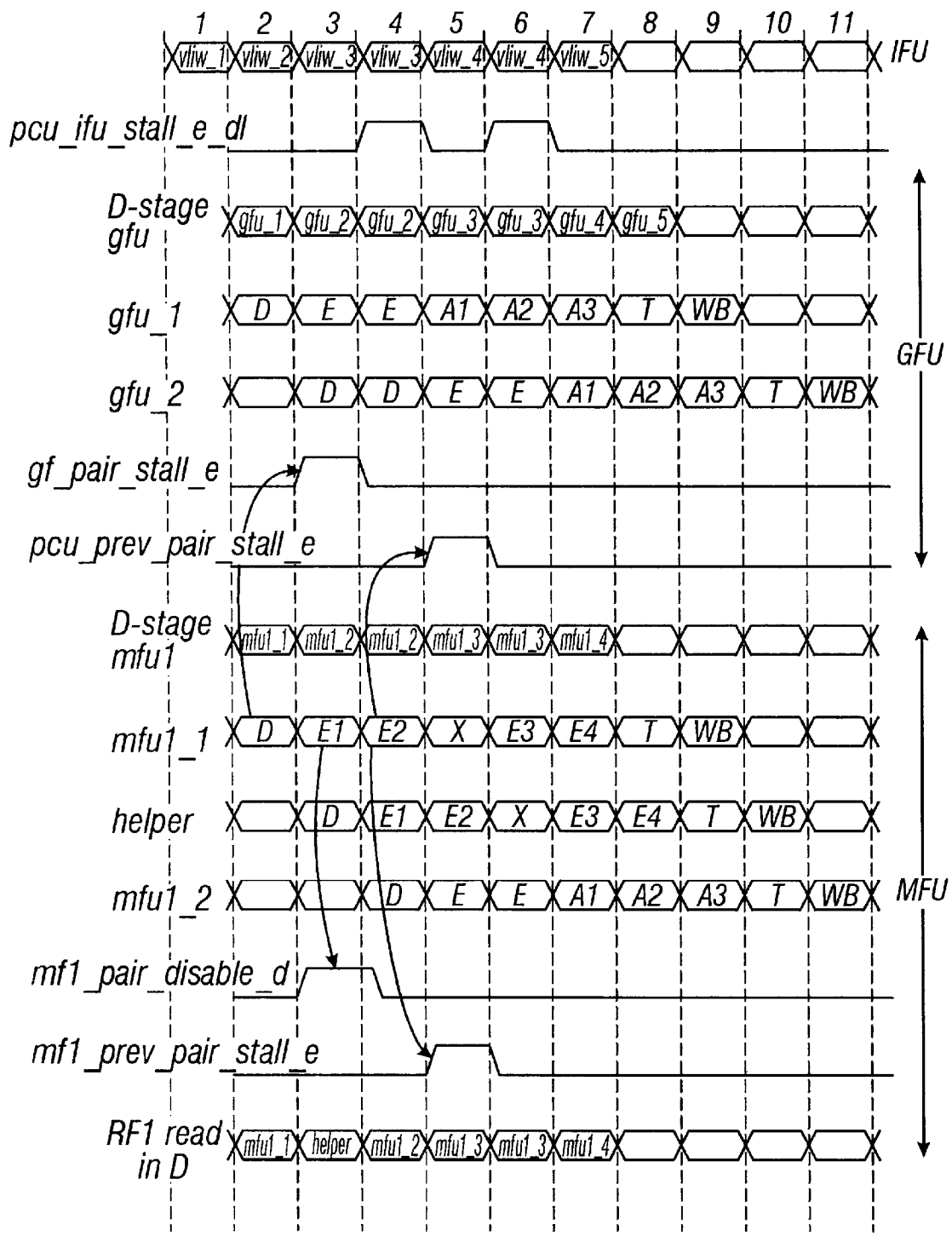

FIG. 15C shows a timing diagram for execution of a five cycle pair instruction.

Figure 15D:
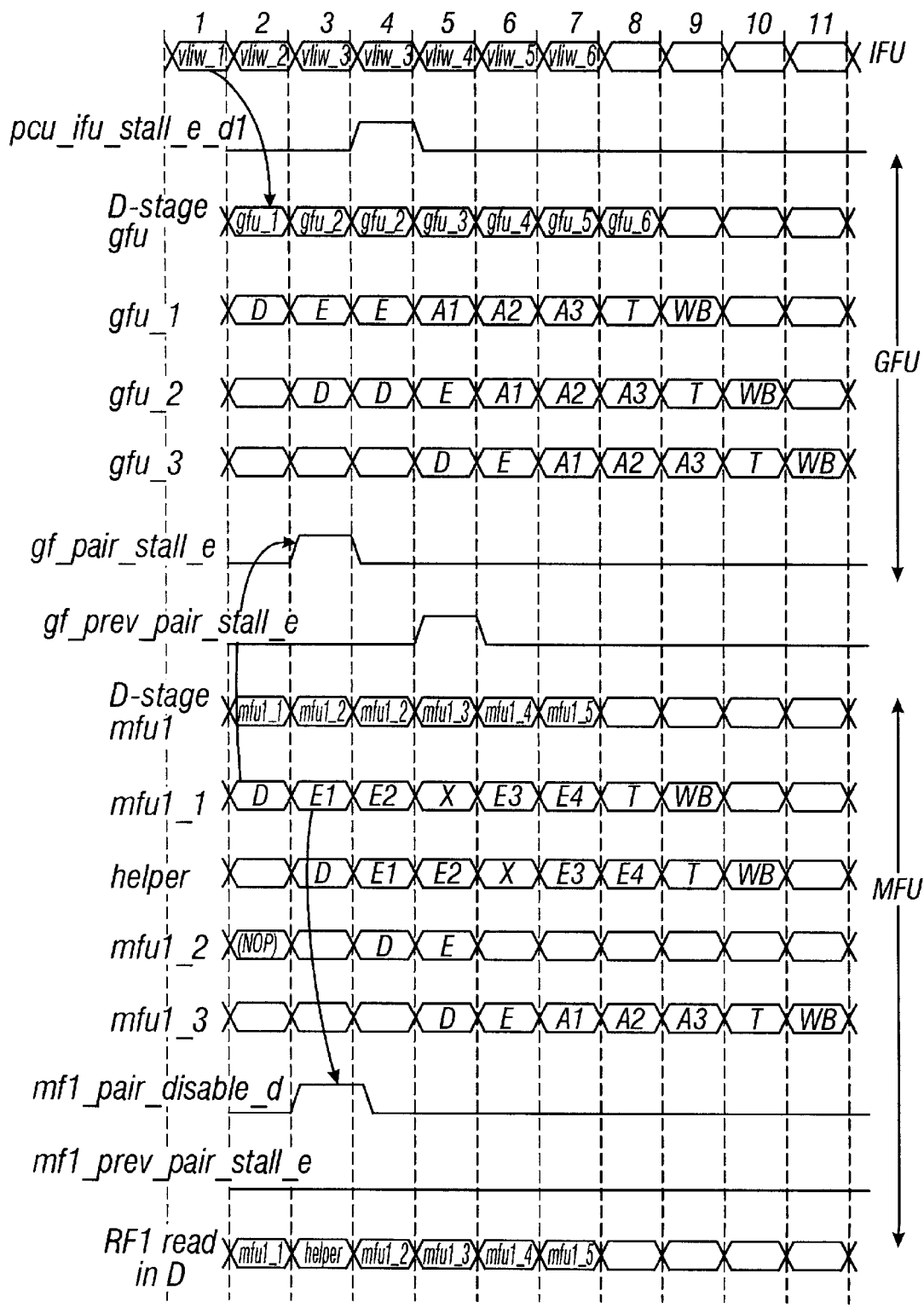

Referring FIG. 15D, a timing diagram illustrates execution of a first instruction of a five cycle pair instruction and a inherent second instruction of the pair. Instructions in vliw_2 stall in the E-stage to avoid a port conflict of the inherent second instruction of the pair instruction mfu_1 with instruction mfu_2. An invalid or nop instruction in mfu_1 prevents an E-stage stall from occurring, using a previous instruction pair stall signal to avoid a port conflict. The scoreboard entry is updated at the rising edge of the clock that takes the load or long latency instruction from the D-stage to the E-stage under conditions in which: (i) the instruction in the D-stage is either a valid load or a long latency instruction, (ii) a "pcu_trap" signal is not asserted in the cycle, or (iii) no E-stage stall (gf_stalle) is asserted in the cycle. The pcu_trap signal is asserted when a trap occurs in the T-stage and also when instructions such as fetch, done, retry, and setir update registers other than the program status register (PSR) (not shown) reach the writeback stage. The pcu_trap signal invalidates pipeline stages from the D-stage to the T-stage.

Figure 15E:
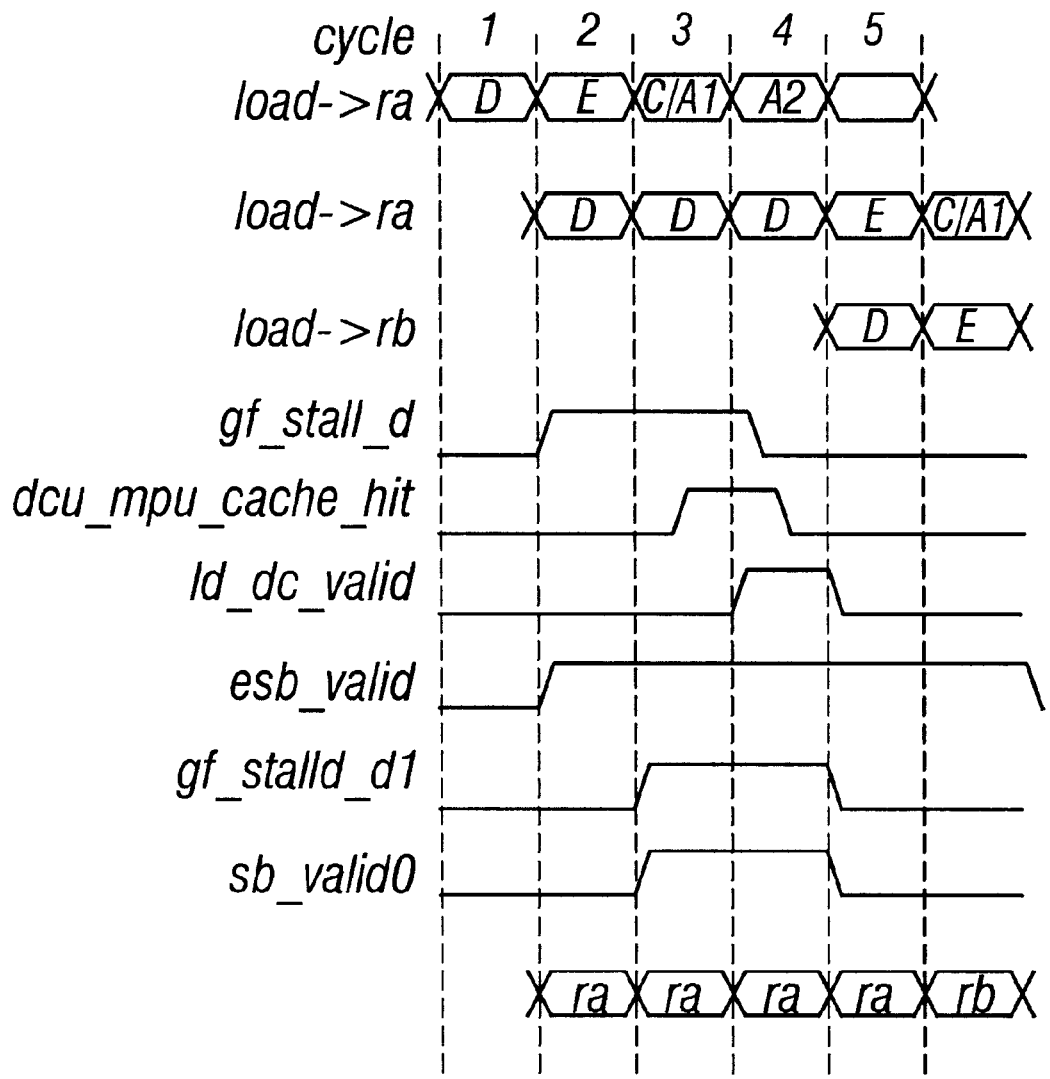

Referring to FIG. 15E, a timing diagram shows entering of a load in an E-stage entry of the scoreboard. The scoreboard entry is updated even if the scoreboarded instruction stalls in the D-stage with output dependency with a previous load or long latency instruction. The D-stall is asserted very late in the cycle so that insufficient time remains to qualify the write operation of the E-stage entry with gf_stalld. All scoreboard matches against the E-stage entry of the scoreboard are disqualified if a D-stage stall occurred in the previous cycle.

Cycle 1 includes a load to register ra, which enters the scoreboard entry in cycle 2 and enters the first invalid entry in load scoreboard in cycle 3. Another load occurs in cycle 2 with output dependency with the load in cycle 1, generating a D-stage stall (signal gf_stall_d). The load, despite being stalled, enters the scoreboard entry in cycle 3. However any hit to the scoreboard entry in cycles 3 and 4 are disqualified by the delayed version of the general functional unit 222 stall signal (gf_stalld_d1) preventing self-interlocking of the second load. A third load does not detect assertion of the gfu stall signal (gf_stalld_d_) and enters the scoreboard entry is cycle 6.

The scoreboard entry update is not qualified by any mispredict in the E-stage that results from timing reasons. If a branch operation occurs following a load and if the branch is mispredicted, then the load still enters the scoreboard entry but will not enter the load scoreboard or the long scoreboard.

If the instructions include a jump long (jmpl), ifu does not send a valid instruction following the jmpl call.

Figure 16A:
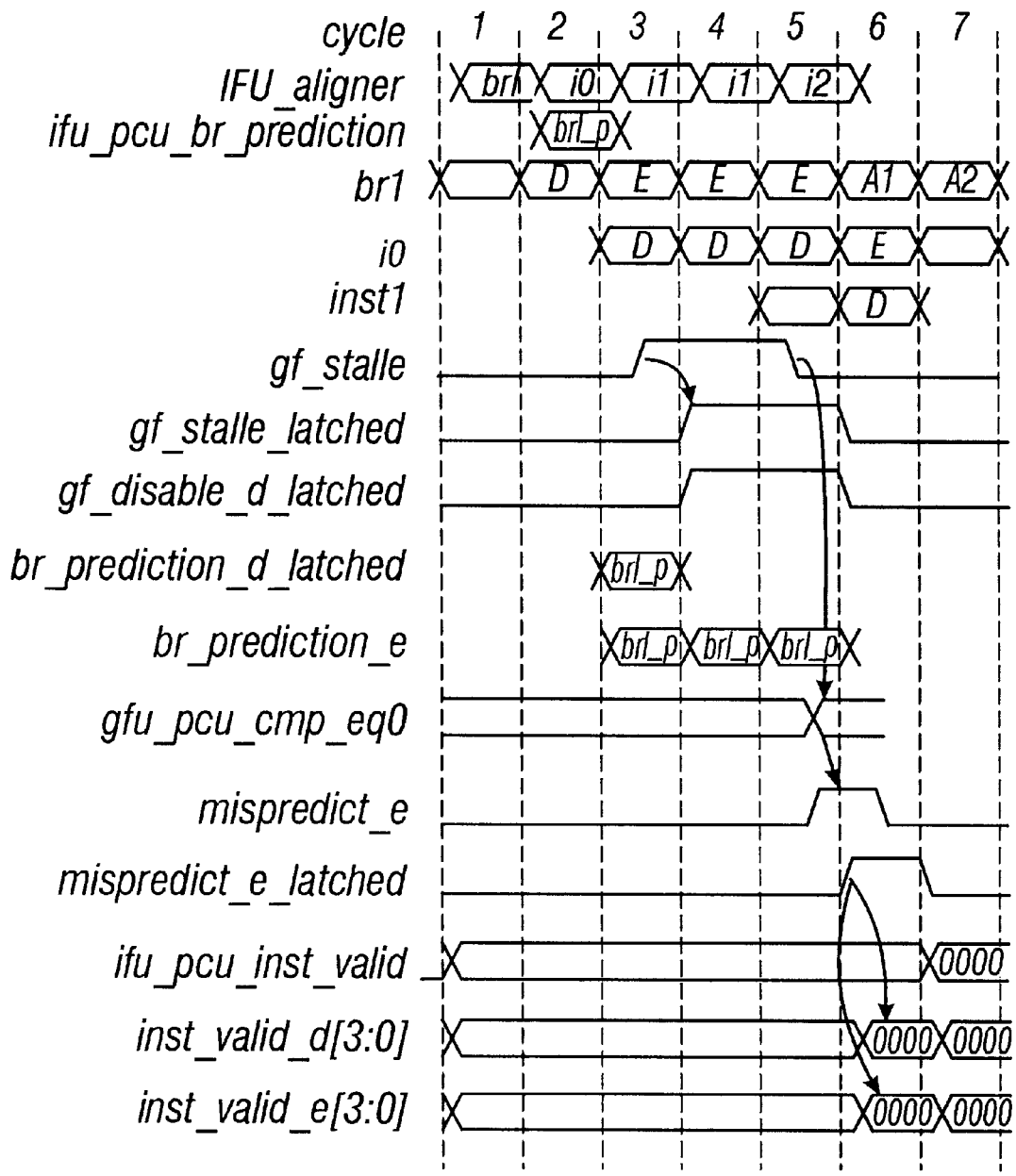
FIGS. 16A–16C are a plurality of timing diagrams that illustrate the timing of branching operation including generation of stall signals.
Figure 16B:
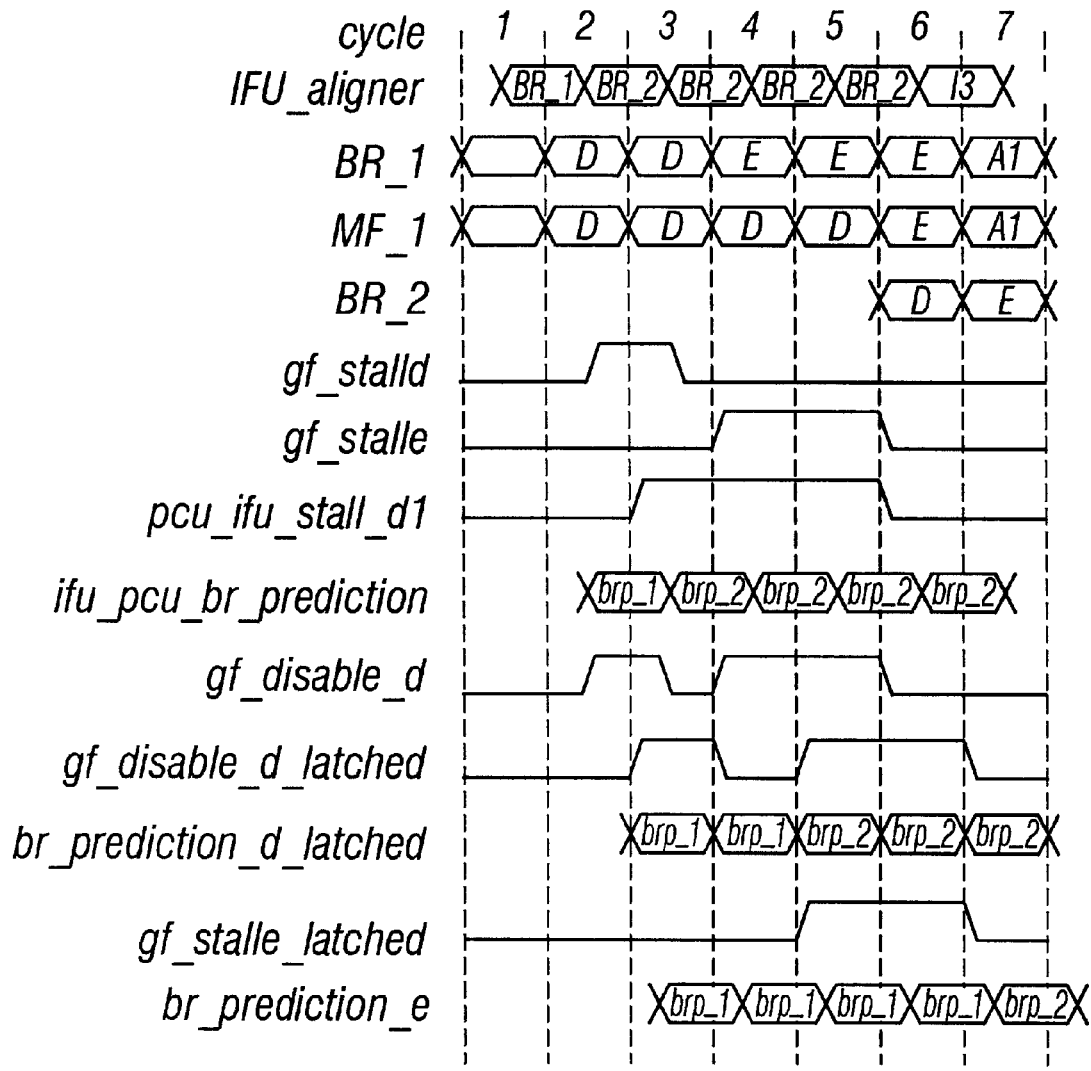

Referring to FIGS. 16A–16B, a plurality of timing diagrams illustrate the timing of branching operation including generation of stall signals. FIG. 16A shows a branch mispredict computation that determines whether either the branch instruction or the mfu1 instruction of one VLIW packet stalls in an E-stage. Branch prediction information is saved and recirculated in cycles 4 and 5 in stage-E. A mispredict signal is asserted only when no E-stage stall occurs.

FIG. 16B is a timing diagram that shows two back-to-back branches (br1 and br2) with br1 stalling in D-stage for one cycle, then stalling in E-stage for two cycles more while waiting for mfu1. Signals brp_1 and brp_2 are, respectively, branch prediction outcomes of the br1 and br2 branches.

Figure 16C:
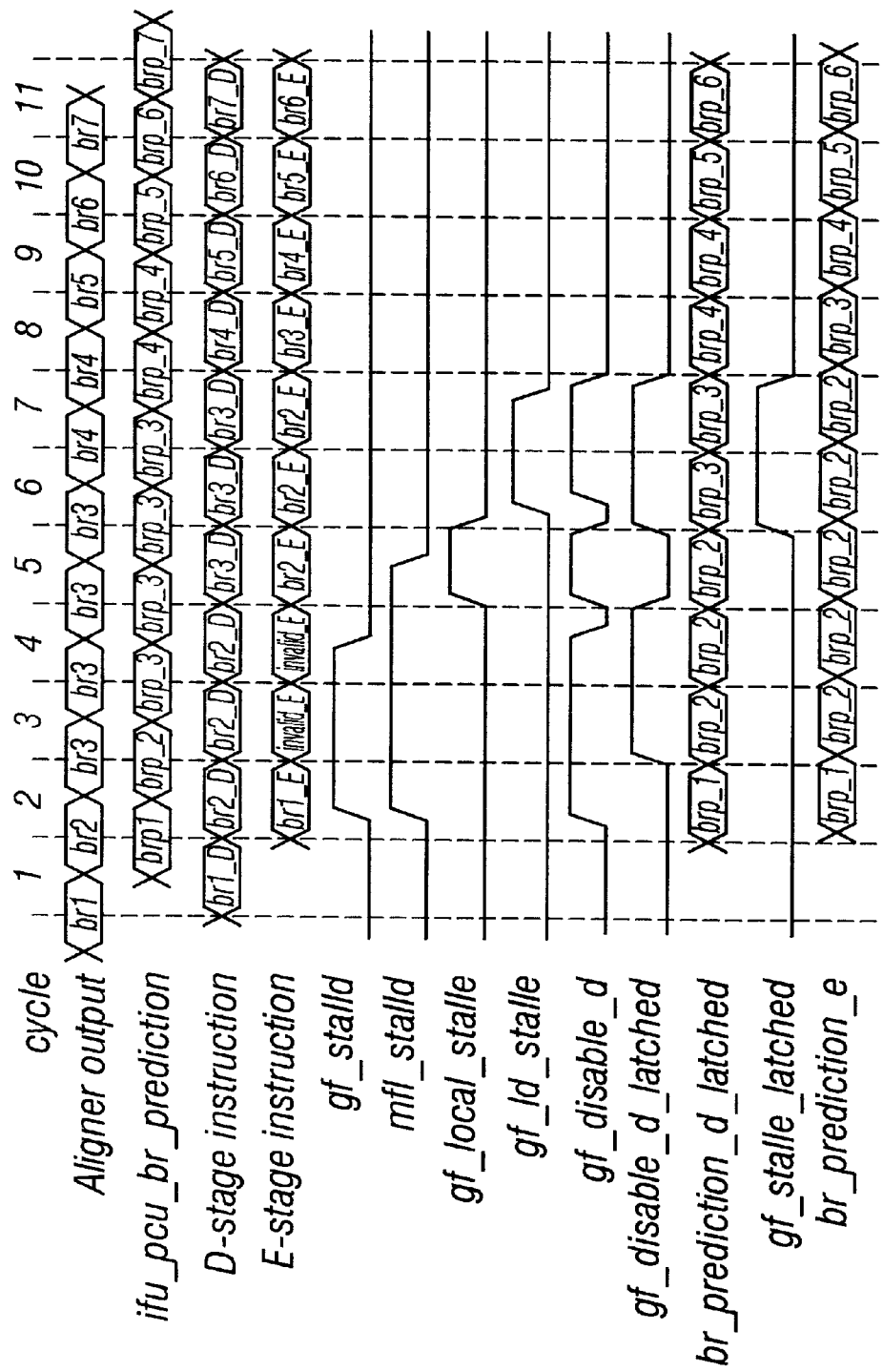

FIG. 16C is a timing diagram showing back-to-back branches with both a D-stall and an E-stall.

Figure 17:
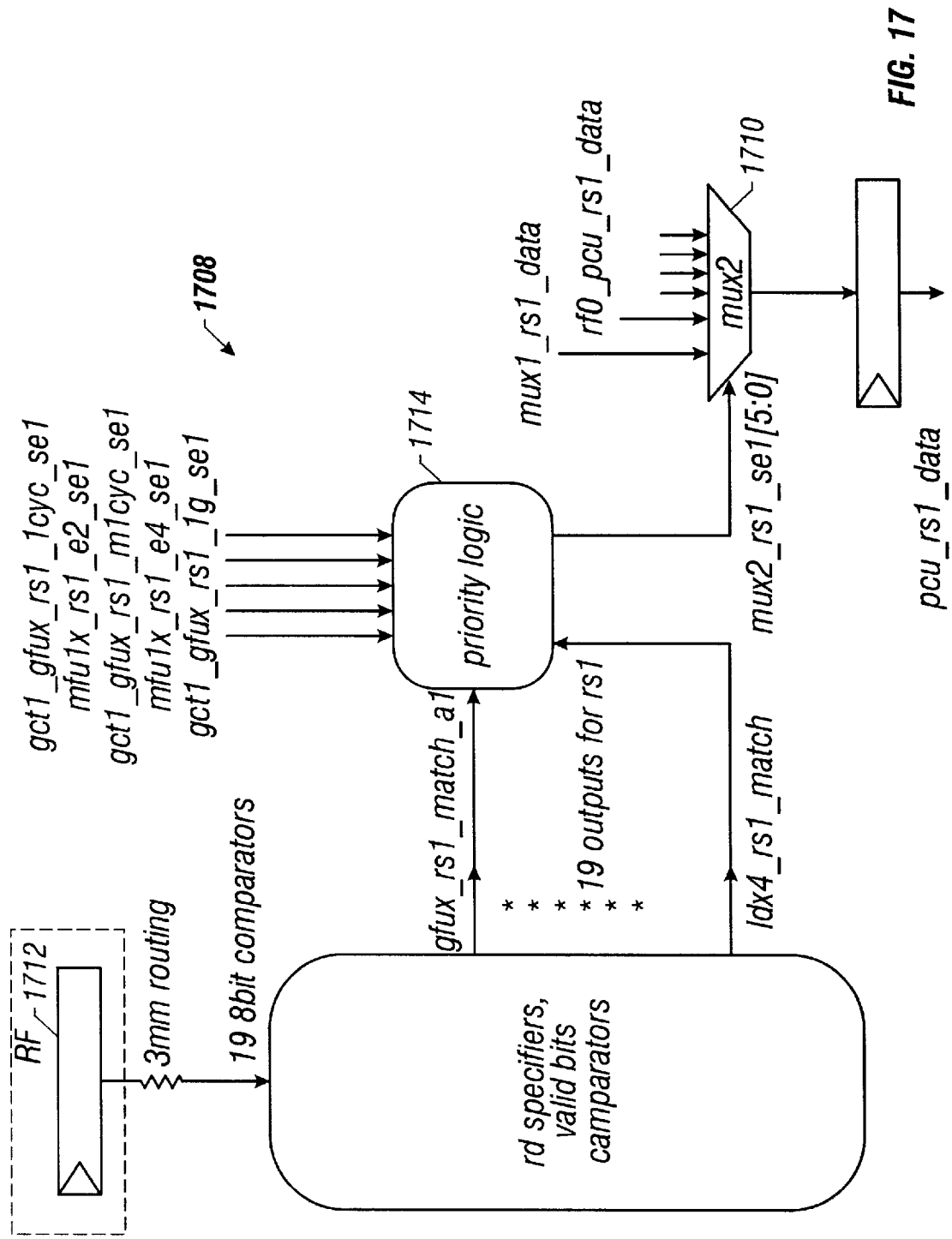
FIG. 17 is a schematic block diagram showing the timing path of the gfu annex.

Referring to FIG. 17, a schematic block diagram shows the timing path of the gfu annex 1708. The critical path of annex timing is set by a select signal passing to a final multiplexer (mux2) 1710 which selects between register file data and annex data. Register specifiers rs/rd are received from D-stage flip-flops that are placed at the top of the register file 1712. Routing from the D-stage flip-flops to the annex 1708 extends approximately 3 mm, which corresponds to a timing of 0.3–0.4 ns. Each rs/rd specifier passes through nineteen 8-bit comparators in the gfu annex 1708. The comparators correspond to the A1-WB stages of gfu/mfu1 instructions, T-WB stages of mfu2/mfu3 instructions, and the A4-stage of long latency instructions and the four 1dx stages.

Match signals from the comparators in the gfii annex 1708 are 'ORed' to produce annex_rs_match signals that are further 'ORed' with any other bypass detected in priority logic 1714. The final output signal designates whether the register file data is selected. The select signal passes to the mux2 1710.

Figure 18:
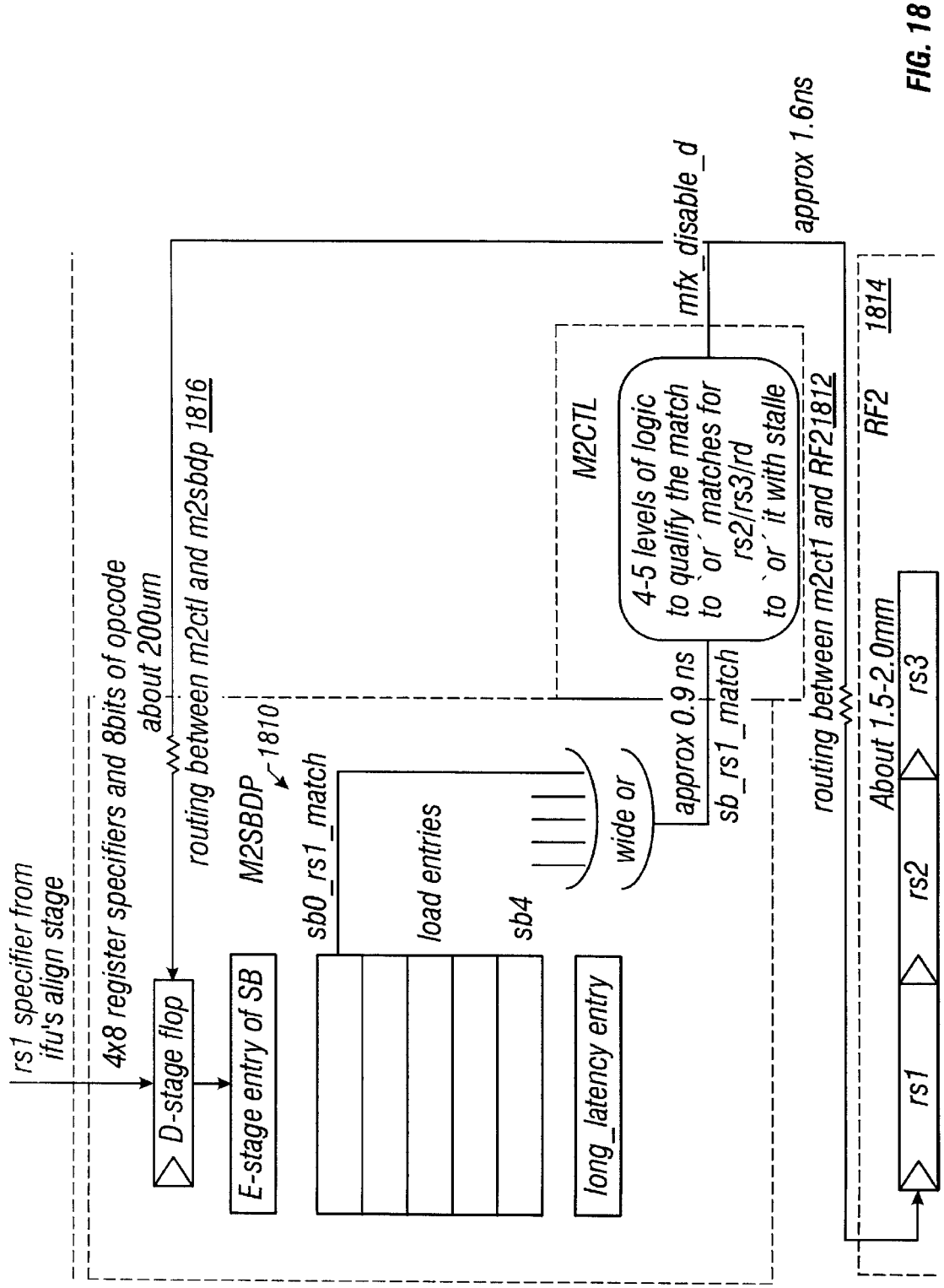
FIG. 18 is a schematic block diagram illustrating a D-stage stall path.

Referring to FIG. 18, a schematic block diagram illustrates a D-stage stall path. The D-stage stall path has critical timing that is dominated by scoreboard checking 1810 and stalling of the D-stage of gfu/mfu instructions. The register specifiers rs/rd are compared against five load entries, one long latency entry, and the entry in the scoreboard 1810. The operation of comparing against the load entries is the critical timing path. Output signals from all the scoreboard entries are 'ORed' together to produce a match signal (sb_rs1_match) that is routed to a m2ctl control block 1812. The m2ctl control block 1812 further qualifies the match status with various bits including bits that designate validity of the instruction (instruction valid bit), whether the load has returned from the load/store unit 218, whether the rs specifier is valid for the instruction, and the like.

The final match signal is 'ORed' with all other matches, such as long latency entry match, scoreboard entry match, and the like, and the matches for other source and destination operands to form the D-stage stall signal, mf2_stalld. The D-stage stall signal mf2_stalld is ORed with the E-stage stall signal mf2_stalle to form an mfu2 disable signal mf2_disable_d which is sent to the flip-flops (not shown) containing the D-stage instruction in a mfu2 scoreboard data path 1816 and to the flip-flops containing the source specifiers of mfu2 instruction in register file 2 1814. Critical timing in the path includes scoreboard checking, routing to the register file 2 1814 and loading of flip-flops in the register file 2 1814 and the m2ctl control block 1812.

Figure 19:
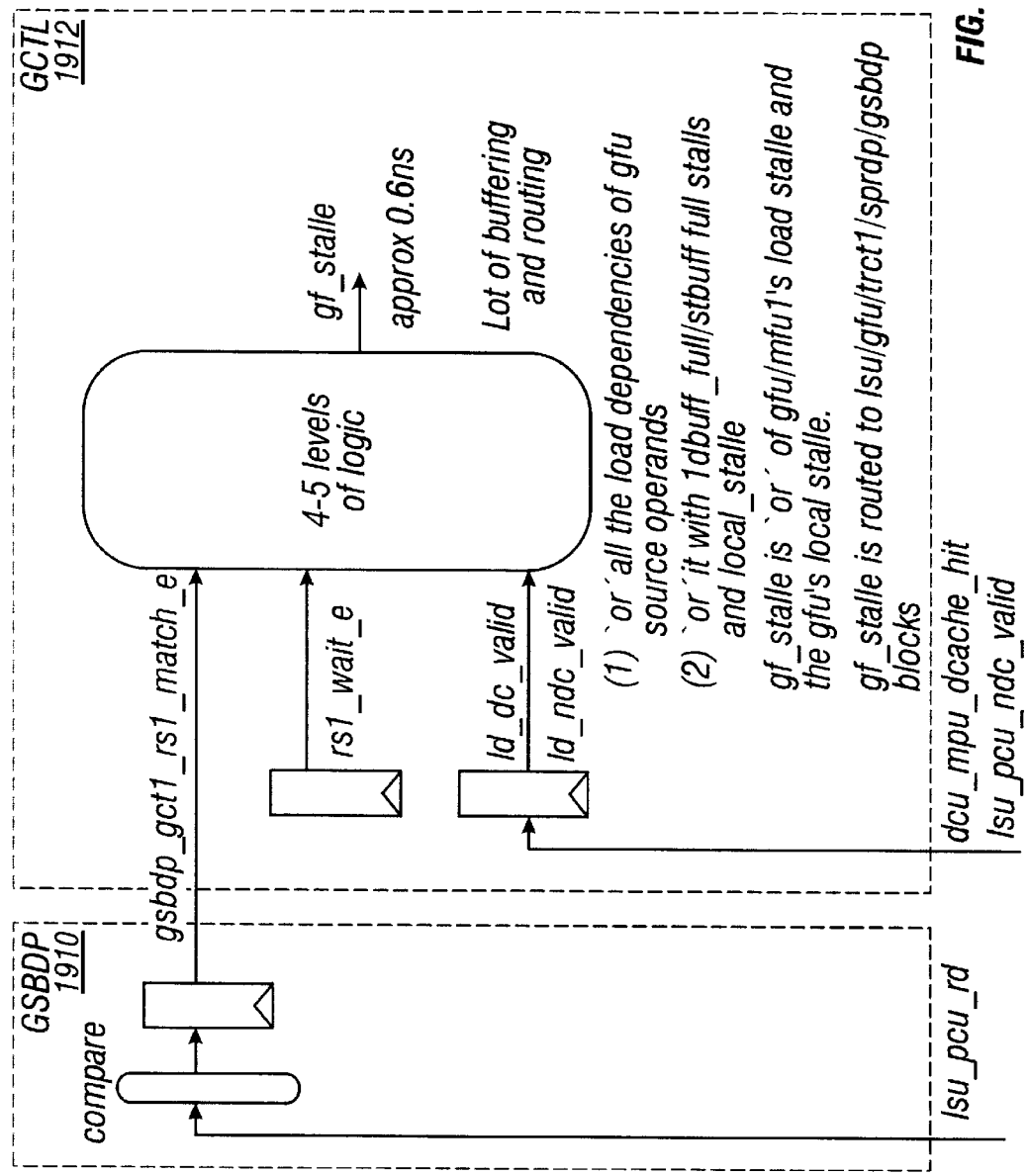
FIG. 19 is a schematic block diagram illustrating an E-stage stall path.

Referring to FIG. 19, a schematic block diagram illustrates an E-stage stall path. The E-stage stall path includes a general scoreboard data path 1910 and a general functional unit controller 1912. E-stage stalls are generated only in the gfu and mfu1 units. If a load is a data cache hit, data is sent to the pipeline control unit 226 in C/A1 stage. The load/store unit 218 sends an rd specifier (1su_pcu_rd) to the general scoreboard data path 1910 in the C/A1 stage along with a data size indicator. The data cache hit signal arrives very late in the C/A1 stage. Therefore, in the cycle the load/store unit 218 sends the rd specifier, the general scoreboard data path 1910 includes a comparator that compares the address of the load rd specifier against the rs/rd specifiers of instructions going to the E-stage. The match result of the comparison is sent to the general functional unit controller 1912 and qualified in the next cycle with data cache valid or not valid signals to generate the E-stage stall.

The general functional unit controller 1912 qualifies a match_e signal with load data cache valid or not valid signals and ORs the matches of register specifiers rs1, rs2, rd, and strd1 to form a gfu load E-stall (gf_1d_stalle) signal. The gf1d_stalle signal is ORed with all other E-stage stalls of the general functional unit 222, the load E-stage stalls of the first media functional unit 220 (mfu1), and the local E-stage stall of the general functional unit 222 (gf_local_stalle).

The final stall signal of the general functional unit 222 (gf_stalle) has approximately four levels of logic inside the general functional unit controller 1912 and generates an output signal (gf_stalle) that is applied to hundreds of flip-flops in the several functional units of the processor 100. The gf_stalle signal qualifies a "cacheable_1d_e signal" applied to the data cache 106. The E-stage stall timing path is limited by loading and routing delay.

Referring to FIGS. 20A and 20B, a VLIW packet diagram and a pipeline diagram respectively illustrate an operation of scoreboard checking with anti-dependency in the same group, which illustrates an advantage of E-stage entry in the scoreboard. An exemplary VLIW packet is shown in FIG. 20A and includes three VLIW packets, vliw_0, vliw_1, and vliw_2. The vliw_0 packet contains a long-latency instruction writing to register r2. The vliw_1 packet contains a mfu1 instruction with r1 and r2 as source specifiers and r3 as a destination specifier (m1_1) and a gfu load that writes to register r1 (1d_l).

As shown in the pipeline diagram of FIG. 20B, since instruction m1_1 has a dependency with the previous long instruction, instruction m1_1 stalls in D-stage as instruction 1d_1 enters E-stage in cycle 2, thereby updating the esb_ entry of the scoreboard. Since instruction 1d_1 waits for instruction m1_1 to enter the E-stage, logic asserts a 'gf_local_stalle' signal in cycles 2, 3, and 4. While instruction m1_1 is stalled in the D-stage in cycles 2, 3, and 4, the instruction m1_1 is prevented from detecting the register rl in the scoreboard by qualifying all hits to the scoreboard entry with the gf_local_stalle signal not present. In cycle 5, the gf_local_stalle signal is deasserted and the load is sent to the load/store unit 218. Instructions 1d_2 and m1_2 have load-use immediate dependency and therefore stall in the D-stage in cycle 5. If the 1d_1 instruction is a cache hit returning data in cycle 6, then instructions m1_2 and 1d_2 do not generate any E-stage stalls.

Figures 21C, 22A:
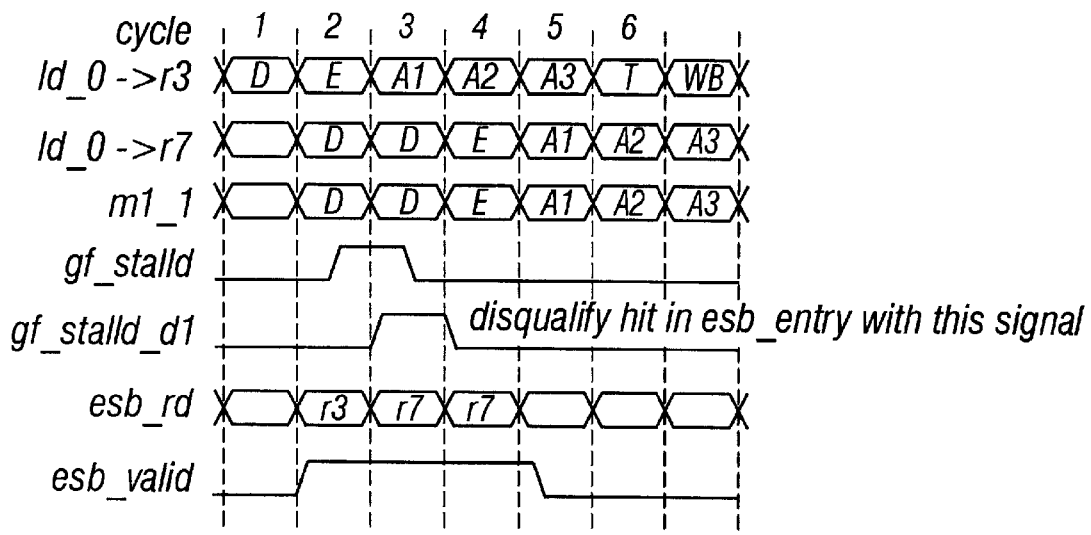

Referring to FIGS. 21A, 21B, and 21C respectively, a VLIW packet diagram, a pipeline diagram, and a timing diagram illustrate an operation of updating an E-stage scoreboard entry in the presence of a D-stage stall. If a load or long-latency instruction stalls in the D-stage, then the instruction should not update the scoreboard so the scoreboard will not self-interlock in the next clock cycle. Since the scoreboard write and reset pointers are generated in the general functional unit controller 1912 and routed to all scoreboards, qualifying the write pointer with a D-stage stall, which is generated in about 1.6 ns, may become timing critical. Therefore, in the illustrative implementation, a write to the scoreboard entry is not qualified by the D-stage stall in the general functional unit 222. Any hit to the esb_entry of the scoreboard in any cycle is qualified by the absence of the D-stage stall in the previous cycle.

The instructions 1d_1 and m1_1 have load-use immediate dependency with instruction 1d_0. The instruction 1d_1 enters the E-stage entry of the scoreboard at the end of cycle 1, and is therefore detectable from cycle 2. The instruction 1d_1 asserts a D-stage stall in cycle 2. The stall is staged (gf_stalld_d1) and any hit to the scoreboard entry is cycle 3 is disqualified by the gf_stalld_d1 signal so that the 1d_1 instruction does not detect any hit from the scoreboard entry in cycle 3. Similarly, instruction 1d_1 does not detect any hit from the scoreboard entry in cycle 3.

Figure 22B:
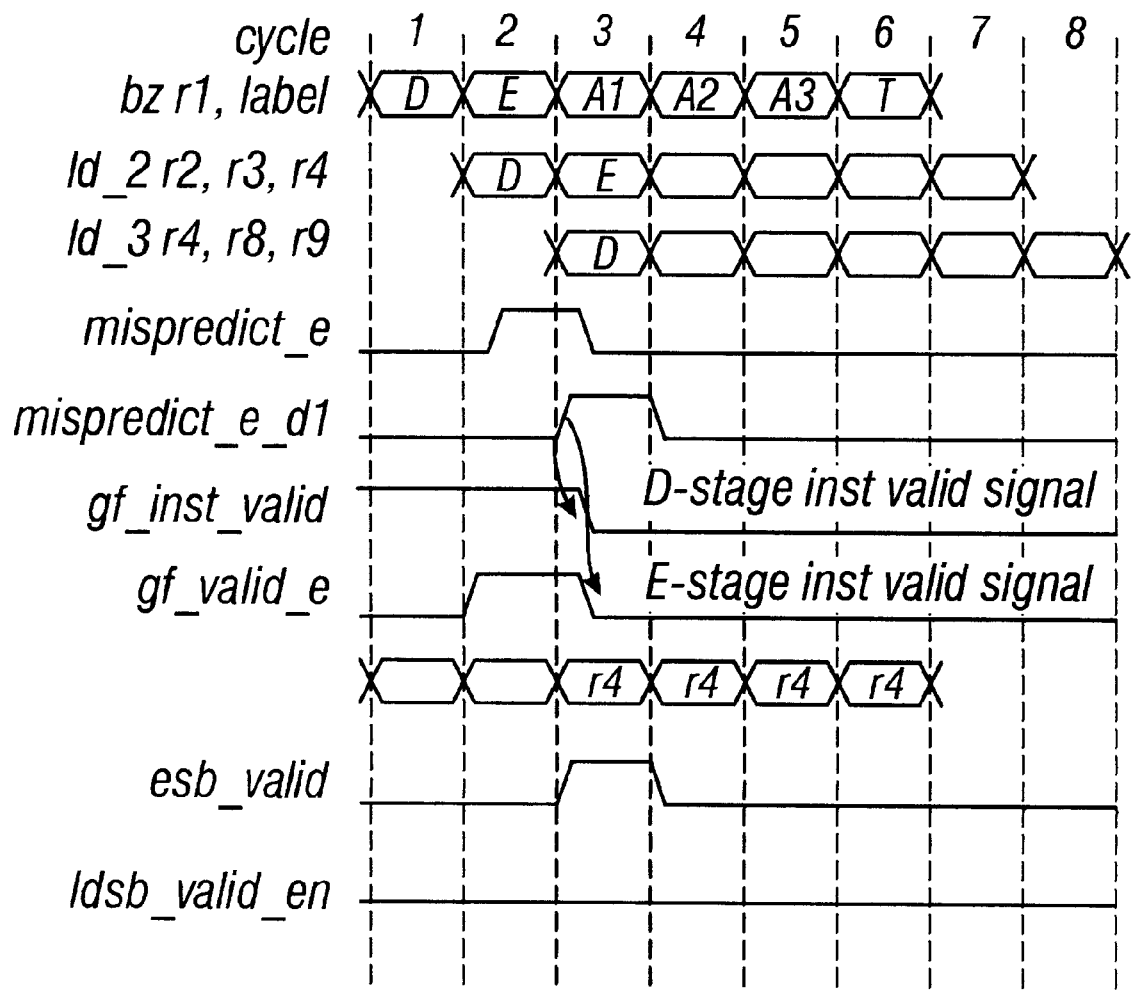

Referring to FIGS. 22A and 22B respectively, a pipeline diagram and a timing diagram illustrate an operation of updating an E-stage entry in the presence of a mispredict in E-stage. The operation of writing to the scoreboard entry in E-stage, like the similar operation for the D-stage stall, is not qualified with the mispredict status of a branch in the E-stage. In the illustrative example, a branch instruction in group vliw_1 is a mispredict. When the branch instruction is in E-stage, the pipeline control unit 226 generates a 'mispredict_e' signal which is asserted late in the cycle, with insufficient time to qualify the scoreboard write of instruction 1d_2 with the mispredict.

The instruction 1d_2 enters the scoreboard entry in cycle 3, when the staged version of mispredict is asserted with a 'pcu_ifu_mispredict_e_d1' signal. The signal prevents the instruction 1d_2 from entering the load scoreboard in cycle 4. The D-stage and E-stage instruction valid bits are deasserted in cycle 4 with the 'pcu_ifu_mispredict_e_d1' signal. Therefore, the 1d_3 instruction which has load-use dependency with instruction 1d_2 does not generate a stall in cycle 4.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

What is claimed is:

1. A processor comprising:
an instruction buffer including a plurality of segments that store a plurality of subinstructions corresponding to respective segments of the plurality of segments;
a plurality of functional units coupled to the instruction buffer, the plurality of functional units that receive the corresponding plurality of subinstructions for execution; and
a pipeline control unit including a plurality of pipeline control segments respectively coupled to corresponding functional units of the plurality of functional units, the pipeline control segments controlling the pipeline of the corresponding functional unit to detect a stall condition that is local to a functional unit and stall the local functional unit independently of nonlocal functional units in an initial timing cycle, and propagating a stall to the nonlocal functional units in a subsequent timing cycle.

2. The processor according to claim 1 further comprising:
stall detection logic circuitry in a pipeline control unit that detects stall conditions only local to a corresponding functional unit without waiting to receive condition information from other functional units that is transmitted over long wires.

3. The processor according to claim 1 further comprising:
local stall logic circuits distributed over diverse areas of an integrated circuit so that stall conditions in the diverse areas are detected and handled locally and independently.

4. The processor according to claim 1 further comprising:
interconnects from the local stall logic circuits to nonlocal stall logic circuits for propagating stalls beyond a local functional unit in subsequent timing cycles.

5. The processor according to claim 1 wherein:
the functional units execute subinstructions including long-latency subinstructions; and
for a long-latency subinstruction that is stalled by another subinstruction in an instruction, the pipeline control unit bypasses long-latency subinstructions to more-recently issued functional unit subinstructions as soon as results are available.

6. The processor according to claim 1 wherein:
the functional units and corresponding pipeline control segments include a plurality of stages that form pipelines, the stages including execution stages and annex stages, the stages having a priority relative to other stages, the annexes including a compare match logic that enforces a bypass priority among subinstructions.

7. The processor according to claim 1 further comprising:
a functional unit that executes pair instructions that execute with two or more cycle latency, the pipeline control unit responsive to a multiple-latency subinstruction in an instruction word by stalling all subinstructions in the instruction word in an execute stage so that all subinstructions read a trap stage simultaneously.

8. The processor according to claim 1 further comprising:
a functional unit that executes pair instructions executing with two or more cycle latency, the pipeline control unit responsive to a pair instruction by stalling all subinstructions in a next issued instruction word for one cycle so that a second instruction of the instruction pair does not have a resource conflict with a subsequent subinstruction in a same subinstruction position.

9. The processor according to claim 1 further comprising:
a functional unit that executes pair instructions executing with two or more cycle latency, the pipeline control unit responsive to a pair instruction in a subinstruction position that is followed in a next cycle by a next issued instruction word which is vacant in the pair instruction subinstruction position by executing, without stalling, a second instruction word of the instruction pair concurrently with the subinstructions in the next issued instruction word.

10. The processor according to claim 1 further comprising:
a functional unit that executes pair instructions executing with two or more cycle latency, the pipeline control unit responsive to a condition of (1) a multiple-cycle latency pair instruction in a first subinstruction position in a cycle N instruction word, (2) at least one pair instruction is included in either a next cycle N+1 instruction word or a next following cycle N+2 instruction word, and (3) a valid instruction is in the first subinstruction position in the cycle N+1 instruction word, the pipeline control unit responsive by (i) bypassing a result of the pair instruction in the N cycle instruction word for a pair instruction in the first subinstruction position at least four instruction words (N+4) subsequently, (2) executing an instruction that uses the result of the pair instruction in the N cycle instruction word at least for instruction words (N+4) subsequently.

11. The processor according to claim 1 further comprising:
a scoreboard storage coupled to the pipeline control unit, the scoreboard storage including a plurality of fields that hold information relating to load operations and long-latency operations when operations transition from a decode stage to an execute stage, the scoreboard storage, the information including a field storing a destination register specifier of a load instruction or long-latency instruction, a field to designate whether an instruction is a load instruction or a long-latency instruction, and a field to indicate whether the instruction is a pair instruction, the pipeline control unit coupled to the scoreboard and initiating a stall according to relative positioning of load instructions, long latency instructions, and pair instructions in a pipeline.

12. The processor according to claim 1 further comprising:
a scoreboard storage coupled to the pipeline control unit, the scoreboard storage including a field that holds information relating to a CALL operations, the pipeline control unit coupled to the scoreboard and initiating a stall to prevent conflict between an unfinished load operation and a CALL return operation.

13. The processor according to claim 1 further comprising:
a scoreboard storage coupled to the pipeline control unit, the scoreboard storage being replicated for all pipeline control segments respectively corresponding to all functional units, the pipeline control segments having pointers to update and reset the scoreboard entries in all replicated scoreboard storages generated in a single control block of the pipeline control unit.

14. The processor according to claim 1 further comprising:
a scoreboard storage coupled to the pipeline control unit, the scoreboard storage being replicated for all pipeline control segments respectively corresponding to all functional units, the pipeline control segments being connected by a plurality of read ports to the replicated scoreboard storage for checking data and output dependencies in a same cycle.

15. The processor according to claim 1 further comprising:
a logic that generates a decoder (D) stage stall for a group of conditions including:
detection of an output dependency when a previous load operation is unfinished;
detection of an output dependency of a long-latency instruction when the long-latency instruction is not in a final execute stage of a cycle;
detection of a source register specifier or a destination register specifier that matches a scoreboard entry; and
detection of a long-latency instruction in the D stage when a valid long-latency instruction already is logged in the scoreboard but does not reset the scoreboard in the cycle.

16. The processor according to claim 1 further comprising:
a pipeline control unit logic that controls execution of subinstructions of an instruction word to wait in an execute stage although the individual subinstructions in the instruction word may enter the execution stage in different timing cycles, the pipeline control unit logic waiting until all subinstructions of the instruction word have entered the execute stage for execution.

17. The processor according to claim 1 further comprising:
a logic that generates an execution (E) stage stall for a group of conditions including:
detection of a load use dependency with a previous load;
detection of an instruction when a load buffer or a store buffer is full;
detection of a stall for synchronizing long latency pair instructions; and
detection of a stall to avoid a port conflict.

18. The processor according to claim 1 further comprising:
a general functional unit of the plurality of functional units; and
a plurality of media functional units of the plurality of functional units.

19. The processor according to claim 1 further comprising:
a register file coupled to the functional units, the register file including registers for holding source registers and destination registers that are accessed by the functional units during execution of instructions.

20. A processor comprising:
an instruction buffer including a plurality of segments that store a plurality of subinstructions corresponding to respective segments of the plurality of segments;
a plurality of functional units coupled to the instruction buffer, the plurality of functional units that receive the corresponding plurality of subinstructions for execution; and
a pipeline control unit including a plurality of pipeline control segments respectively coupled to corresponding functional units of the plurality of functional units, the pipeline control segments controlling the pipeline of the corresponding functional unit: (1) stalling the entire plurality of subinstructions of an instruction word for a true dependency or an output dependency, (2) stalling only until a result is available for intra-functional unit bypass for a stall condition in a first priority functional unit, and (3) stalling until a result reaches a pipeline writeback stage for a stall condition in a second priority functional unit.

21. A processor according to claim 20 wherein:
the plurality of pipeline control segments are local pipeline control segments that are respectively coupled to corresponding local functional units of the plurality of functional units,
the local pipeline control segments locally control the pipeline of the corresponding local functional unit independently of condition information of nonlocal functional units in a timing cycle that a stall condition is detected and propagate the detected stall condition to nonlocal functional units in subsequent cycles.

22. A processor according to claim 20 wherein:

the plurality of pipeline control segments are local pipeline control segments that are respectively coupled to corresponding local functional units of the plurality of functional units, and a stall occurs locally within the local pipeline control segments independently of other pipeline control segments in a first timing cycle, the local stall expanding to the other pipeline control segments in subsequent timing cycles.

23. A method of executing instructions in a processor comprising:

storing an instruction word in an instruction buffer, the instruction buffer including a plurality of segments that store a respective plurality of subinstructions that, in combination, make up the instruction word;

receiving from the instruction buffer a plurality of subinstructions for execution at a plurality of functional units that are coupled to the instruction buffer; and controlling a plurality of instruction pipelines, individual pipelines receiving a subinstruction from a corresponding instruction buffer segment and executing the subinstruction in a corresponding functional unit; and controlling the pipeline of the corresponding functional unit to detect a stall condition that is local to a functional unit and stall the local functional unit independently of nonlocal functional units in an initial timing cycle, and propagating a stall to the nonlocal functional units in a subsequent timing cycle.

24. The method according to claim 23 further comprising:

detecting stall conditions only local to a corresponding functional unit without waiting to receive condition information from other functional units that is transmitted over long wires.

25. The method according to claim 23 further comprising:

distributing local stall logic circuits over diverse areas of an integrated circuit so that stall conditions in the diverse areas are detected and handled locally and independently.

26. The method according to claim 23 further comprising:

propagating stalls beyond a local functional unit in subsequent timing cycles using interconnects from the local stall logic circuits to nonlocal stall logic circuits.

27. The method according to claim 23 further comprising:

executing subinstructions including long-latency subinstructions; and for a long-latency subinstruction that is stalled by another subinstruction in an instruction, bypassing long-latency subinstructions to more-recently issued functional unit subinstructions as soon as results are available.

* * * * *